(12) United States Patent
Jiang et al.

(10) Patent No.: US 12,155,861 B2
(45) Date of Patent: Nov. 26, 2024

(54) SYSTEMS AND METHODS FOR IMAGE CODING

(71) Applicant: ZHEJIANG DAHUA TECHNOLOGY CO., LTD., Zhejiang (CN)

(72) Inventors: Dong Jiang, Hangzhou (CN); Jucai Lin, Hangzhou (CN); Jun Yin, Hangzhou (CN); Feiyang Zeng, Hangzhou (CN); Cheng Fang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 543 days.

(21) Appl. No.: 17/447,196

(22) Filed: Sep. 8, 2021

(65) Prior Publication Data

US 2021/0409761 A1 Dec. 30, 2021

Related U.S. Application Data

(63) Continuation of application No. PCT/CN2020/076732, filed on Feb. 26, 2020.

(30) Foreign Application Priority Data

Mar. 12, 2019 (CN) .......................... 201910186240.8

(51) Int. Cl.
*H04N 19/105* (2014.01)
*H04N 19/159* (2014.01)
(Continued)

(52) U.S. Cl.
CPC ......... *H04N 19/593* (2014.11); *H04N 19/105* (2014.11); *H04N 19/159* (2014.11); *H04N 19/167* (2014.11); *H04N 19/176* (2014.11)

(58) Field of Classification Search
None
See application file for complete search history.

(56) References Cited

U.S. PATENT DOCUMENTS 9,196,059 B2 * 11/2015 Jeon .................. H04N 19/46
10,419,754 B1 * 9/2019 Zhao ................ H04N 19/136
(Continued)

FOREIGN PATENT DOCUMENTS

CN 102186086 A 9/2011
CN 102685473 A 9/2012
(Continued)

OTHER PUBLICATIONS

The Extended European Search Report in European Application No. 20769329.2 mailed on Mar. 30, 2022, 10 pages.
(Continued)

*Primary Examiner* — Mohammad J Rahman
(74) *Attorney, Agent, or Firm* — METIS IP LLC

(57) ABSTRACT

The present disclosure relates to systems and methods for image coding. The system may determine a predetermined region in a coding unit in an image, the predetermined region including a plurality of pixels. The system may determine whether a prediction angle of a prediction mode is larger than or equal to 0° and smaller than or equal to 90°. In response to determining that the prediction angle of the prediction mode is larger than or equal to 0° and smaller than or equal to 90°, for each of the plurality of pixels in the predetermined region, the system may determine a preliminary predicted value of the pixel based on at least one of one or more first reference lines associated with the coding unit along a prediction direction corresponding to the prediction angle. The one or more first reference lines may be along a first side or a second side of the coding unit and each of the one or more first reference lines may include a plurality of first reference pixels. The system may determine a compen-
(Continued)

sation predicted value of the pixel based on at least one of one or more second reference lines associated with the coding unit along a compensation direction opposite to the prediction direction. The one or more second reference lines may be along a third side or a fourth side of the coding unit and each of the one or more second reference lines may include a plurality of second reference pixels. The system may determine a target predicted value of the pixel based on the preliminary predicted value and the compensation predicted value.

20 Claims, 17 Drawing Sheets

(51) Int. Cl.
*H04N 19/167* (2014.01)
*H04N 19/176* (2014.01)
*H04N 19/593* (2014.01)

(56) References Cited

U.S. PATENT DOCUMENTS

| | | | |
|---|---|---|---|
| 2010/0002775 A1* | 1/2010 | Huang | H04N 19/14 375/240.27 |
| 2011/0249731 A1 | 10/2011 | Zhao et al. | |
| 2013/0202039 A1 | 8/2013 | Song et al. | |
| 2013/0301709 A1 | 11/2013 | Lim et al. | |
| 2015/0110174 A1* | 4/2015 | Gu | H04N 19/136 375/240.03 |
| 2015/0245021 A1 | 8/2015 | Matsuo et al. | |
| 2016/0021392 A1* | 1/2016 | Bossen | H04N 19/593 375/240.12 |
| 2017/0238012 A1 | 8/2017 | Min et al. | |
| 2017/0347102 A1 | 11/2017 | Panusopone et al. | |
| 2018/0302631 A1* | 10/2018 | Chiang | H04N 19/176 |
| 2018/0309984 A1 | 10/2018 | Son et al. | |
| 2019/0141317 A1 | 5/2019 | Heo et al. | |
| 2019/0273926 A1 | 9/2019 | Heo et al. | |
| 2019/0306498 A1* | 10/2019 | Zhao | H04N 19/593 |
| 2020/0228829 A1 | 7/2020 | Jeon et al. | |
| 2021/0067770 A1* | 3/2021 | Andersson | H04N 19/86 |
| 2021/0076049 A1 | 3/2021 | Yamori | |
| 2021/0329266 A1* | 10/2021 | Andersson | H04N 19/86 |
| 2022/0303556 A1 | 9/2022 | Lainema et al. | |
| 2023/0362353 A1 | 11/2023 | Li et al. | |

FOREIGN PATENT DOCUMENTS

| | | |
|---|---|---|
| CN | 102685505 A | 9/2012 |
| CN | 102984523 A | 3/2013 |
| CN | 103067699 A | 4/2013 |
| CN | 103929641 A | 7/2014 |
| CN | 107786874 A | 3/2018 |
| EP | 3410708 A1 | 12/2018 |
| WO | 2018070898 A1 | 4/2018 |
| WO | 2020181990 A1 | 9/2020 |

OTHER PUBLICATIONS

Chen, Huanbang et al., Description of SDR, HDR and 360° Video Coding Technology Proposal by Huawei, GoPro, HiSilicon, and Samsung, The Joint Video Exploration Team of ITU-T SG. 16 WP 3 and ISO/IEC JTC 1/SC 29/WG 11, 2018, 132 pages.
International Search Report in PCT/CN2020/076732 mailed on May 8, 2020, 4 pages.
Written Opinion in PCT/CN2020/076732 mailed on May 8, 2020, 6 pages.
Xu, X. et al., Predictive Coding of Intra Prediction Modes for High Efficiency Video Coding, 2012 Picture Coding Symposium, 2012, 5 pages.
Yao, Chunlian et al., Intra Prediction Based on Interpolation, 2011 International Conference on Computer Science and Network Technology, 1259-1262, 2011.

* cited by examiner

SYSTEMS AND METHODS FOR IMAGE CODING

CROSS-REFERENCE TO RELATED APPLICATIONS

This application is a Continuation of International Application No. PCT/CN2020/076732, filed on Feb. 26, 2020, which claims priority to Chinese Patent Application No. 201910186240.8 filed on Mar. 12, 2019, the contents of which are incorporated herein by reference in their entirety.

TECHNICAL FIELD

The present disclosure generally relates to image processing technology, and in particular, to systems and methods for image coding.

BACKGROUND

With the development of communication and multimedia technologies, the exploration of image coding which can reduce data redundancy in images has developed rapidly nowadays. Commonly, for pixels in a compensation region in a coding block in an image, an image coding system can encode the pixels based on predicted values and compensation values under some angle modes, both the predicted values and the compensation values can be determined based on reference lines in a left side and an upper side of the coding block. However, in some situations, for some other angle modes (e.g., an angle mode with a prediction angle larger than or equal to 0° and smaller than or equal to 90°), it is impossible to determine compensation values based on the reference lines, which limits the effect of reducing the data redundancy in the image. Therefore, it is desirable to provide improved systems and methods for image coding with improved coding quality and coding efficiency.

SUMMARY

An aspect of the present disclosure relates to a system for image coding. The system may include at least one storage medium including a set of instructions and at least one processor in communication with the at least one storage medium. When executing the set of instructions, the at least one processor may be directed to cause the system to determine a predetermined region in a coding unit in an image, the predetermined region including a plurality of pixels and determine whether a prediction angle of a prediction mode is larger than or equal to 0° and smaller than or equal to 90°. In response to determining that the prediction angle of the prediction mode is larger than or equal to 0° and smaller than or equal to 90°, for each of the plurality of pixels in the predetermined region, the at least one processor may be directed to cause the system to determine a preliminary predicted value of the pixel based on at least one of one or more first reference lines associated with the coding unit along a prediction direction corresponding to the prediction angle, the one or more first reference lines being along a first side or a second side of the coding unit and each of the one or more first reference lines including a plurality of first reference pixels; determine a compensation predicted value of the pixel based on at least one of one or more second reference lines associated with the coding unit along a compensation direction opposite to the prediction direction, the one or more second reference lines being along a third side or a fourth side of the coding unit and each of the one or more second reference lines including a plurality of second reference pixels; and determine a target predicted value of the pixel based on the preliminary predicted value and the compensation predicted value.

In some embodiments, the predetermined region may include an active boundary parallel to a target side of the coding unit. The active boundary may be larger than a centerline between the target side and a side of the coding unit parallel to the target side and less than the side parallel to the target side.

In some embodiments, the at least one of the one or more second reference lines may be determined by determining an intersection second reference pixel located at an intersection area of the third side and the fourth side of the coding unit based on one or more first reference pixels located at an intersection area of the first side and the fourth side, one or more first reference pixels located at an intersection area of the second side and the third side, a height of the coding unit, and a width of the coding unit; and determining a second reference line along the third side including the intersection second reference pixel and remainder second reference pixels determined based on the intersection second reference pixel, the one or more first reference pixels located at the intersection area of the second side and the third side, and the height of the coding unit; or determining a second reference line along the fourth side including the intersection second reference pixel and remainder second reference pixels determined based on the intersection second reference pixel, the one or more first reference pixels located at the intersection area of the first side and the fourth side, and the width of the coding unit.

In some embodiments, to determine the compensation predicted value of the pixel based on the at least one of one or more second reference lines associated with the coding unit along the compensation direction, the at least one processor may be directed to cause the system to determine at least one target second reference line along a target side of the coding unit based on the compensation direction; determine, for each of the at least one target second reference line, an initial compensation predicted value corresponding to the pixel; and determine the compensation predicted value of the pixel based on at least one initial compensation projected value corresponding to the at least one target second reference line.

In some embodiments, for each of the at least one target second reference line, to determine the initial compensation predicted value corresponding to the pixel, the at least one processor may be directed to cause the system further to determine whether the compensation direction intersects the target side. In response to determining that the compensation direction intersects the target side, for each of the at least one target second reference line, the at least one processor may be directed to cause the system further to determine the initial compensation predicted value corresponding to the pixel based on at least one of the plurality of second reference pixels on the target second reference line.

In some embodiments, to determine the initial compensation predicted value corresponding to the pixel based on at least one of the plurality of second reference pixels on the target second reference line, the at least one processor may be directed to cause the system further to determine a projected pixel corresponding to the pixel on the target second reference line along the compensation direction and determine the initial compensation predicted value corresponding to the pixel based on the projected pixel.

In some embodiments, to determine the initial compensation predicted value corresponding to the pixel based on at least one of the plurality of second reference pixels on the target second reference line, the at least one processor may be directed to cause the system further to determine two second reference pixels corresponding to the pixel on the target second reference line along the compensation direction and determine the initial compensation predicted value corresponding to the pixel by performing an interpolation on the two second reference pixels.

In some embodiments, for each of the at least one target second reference line, to determine the initial compensation predicted value corresponding to the pixel, the at least one processor may be directed to cause the system further to determine, in response to determining that the compensation direction does not intersect the target side, at least one candidate second reference line along a candidate side of the coding unit. The compensation direction may intersect the candidate side and each of the at least one candidate second reference line may correspond to a respective one of the at least one target second reference line. For each of the at least one candidate second reference line, the at least one processor may be directed to cause the system further to determine at least one candidate compensation pixel corresponding to the pixel on the candidate second reference line along the compensation direction. For each of the at least one target second reference line, the at least one processor may be directed to cause the system further to determine the initial compensation predicted value corresponding to the pixel based on by mapping the corresponding at least one candidate compensation pixel onto an extension line of the target second reference line.

In some embodiments, in response to determining that the prediction angle of the prediction mode is smaller than 0° or larger than 90°, for each of the plurality of pixels in the predetermined region, the at least one processor may be directed to cause the system to determine the preliminary predicted value of the pixel based on at least one of one or more target first reference lines along the prediction direction corresponding to the prediction angle, wherein for at least one of one or more target first reference lines, a count of first reference pixels on the target first reference line is larger than a first predetermined threshold. The at least one processor may be directed to cause the system further to determine the compensation predicted value of the pixel based on at least one of one or more candidate first reference lines along the compensation direction opposite to the prediction direction, wherein for at least one of one or more candidate first reference lines, a count of first reference pixels on the candidate first reference line is larger than a second predetermined threshold. The at least one processor may be directed to cause the system further to determine a target predicted value of the pixel based on the preliminary predicted value and the compensation predicted value.

In some embodiments, to determine the target predicted value of the pixel based on the preliminary predicted value and the compensation predicted value, the at least one processor may be directed to cause the system further to determine a second weighting coefficient corresponding to the compensation predicted value of the pixel, wherein the second weighting coefficient is associated with a first global distance between the pixel and a first global projection location corresponding to the preliminary predicted value and a second global distance between the pixel and a second global projection location corresponding to the compensation predicted value. The at least one processor may be directed to cause the system further to determine a first weighting coefficient corresponding to the preliminary predicted value of the pixel based on the second weighting coefficient and determine the target predicted value of the pixel by weighting the preliminary predicted value and the compensation predicted value based on the first weighting coefficient and the second weighting coefficient.

A further aspect of the present disclosure relates to a method implemented on a computing device including at least one processor, at least one storage medium, and a communication platform connected to a network. The method may include determining a predetermined region in a coding unit in an image, the predetermined region including a plurality of pixels and determining whether a prediction angle of a prediction mode is larger than or equal to 0° and smaller than or equal to 90°. In response to determining that the prediction angle of the prediction mode is larger than or equal to 0° and smaller than or equal to 90°, for each of the plurality of pixels in the predetermined region, the method may further include determining a preliminary predicted value of the pixel based on at least one of one or more first reference lines associated with the coding unit along a prediction direction corresponding to the prediction angle, the one or more first reference lines being along a first side or a second side of the coding unit and each of the one or more first reference lines including a plurality of first reference pixels; determining a compensation predicted value of the pixel based on at least one of one or more second reference lines associated with the coding unit along a compensation direction opposite to the prediction direction, the one or more second reference lines being along a third side or a fourth side of the coding unit and each of the one or more second reference lines including a plurality of second reference pixels; and determining a target predicted value of the pixel based on the preliminary predicted value and the compensation predicted value.

In some embodiments, the predetermined region may include an active boundary parallel to a target side of the coding unit. The active boundary may be larger than a centerline between the target side and a side of the coding unit parallel to the target side and less than the side parallel to the target side.

In some embodiments, the at least one of the one or more second reference lines may be determined by determining an intersection second reference pixel located at an intersection area of the third side and the fourth side of the coding unit based on one or more first reference pixels located at an intersection area of the first side and the fourth side, one or more first reference pixels located at an intersection area of the second side and the third side, a height of the coding unit, and a width of the coding unit; and determining a second reference line along the third side including the intersection second reference pixel and remainder second reference pixels determined based on the intersection second reference pixel, the one or more first reference pixels located at the intersection area of the second side and the third side, and the height of the coding unit; or determining a second reference line along the fourth side including the intersection second reference pixel and remainder second reference pixels determined based on the intersection second reference pixel, the one or more first reference pixels located at the intersection area of the first side and the fourth side, and the width of the coding unit.

In some embodiments, the determining the compensation predicted value of the pixel based on the at least one of one or more second reference lines associated with the coding unit along the compensation direction may include determining at least one target second reference line along a target side of the coding unit based on the compensation direction; determining, for each of the at least one target second reference line, an initial compensation predicted value corresponding to the pixel; and determining the compensation predicted value of the pixel based on at least one initial compensation projected value corresponding to the at least one target second reference line.

In some embodiments, for each of the at least one target second reference line, the determining the initial compensation predicted value corresponding to the pixel may include determining whether the compensation direction intersects the target side and determining, in response to determining that the compensation direction intersects the target side, for each of the at least one target second reference line, the initial compensation predicted value corresponding to the pixel based on at least one of the plurality of second reference pixels on the target second reference line.

In some embodiments, the determining the initial compensation predicted value corresponding to the pixel based on at least one of the plurality of second reference pixels on the target second reference line may include determining a projected pixel corresponding to the pixel on the target second reference line along the compensation direction and determining the initial compensation predicted value corresponding to the pixel based on the projected pixel.

In some embodiments, the determining the initial compensation predicted value corresponding to the pixel based on at least one of the plurality of second reference pixels on the target second reference line may include determining two second reference pixels corresponding to the pixel on the target second reference line along the compensation direction and determining the initial compensation predicted value corresponding to the pixel by performing an interpolation on the two second reference pixels.

In some embodiments, for each of the at least one target second reference line, the determining the initial compensation predicted value corresponding to the pixel may include determining, in response to determining that the compensation direction does not intersect the target side, at least one candidate second reference line along a candidate side of the coding unit, wherein the compensation direction intersects the candidate side and each of the at least one candidate second reference line corresponds to a respective one of the at least one target second reference line; determining, for each of the at least one candidate second reference line, at least one candidate compensation pixel corresponding to the pixel on the candidate second reference line along the compensation direction; and determining, for each of the at least one target second reference line, the initial compensation predicted value corresponding to the pixel based on by mapping the corresponding at least one candidate compensation pixel onto an extension line of the target second reference line.

In some embodiments, in response to determining that the prediction angle of the prediction mode is smaller than 0° or larger than 90°, for each of the plurality of pixels in the predetermined region, the method may further include determining the preliminary predicted value of the pixel based on at least one of one or more target first reference lines along the prediction direction corresponding to the prediction angle, wherein for at least one of one or more target first reference lines, a count of first reference pixels on the target first reference line is larger than a first predetermined threshold; determining the compensation predicted value of the pixel based on at least one of one or more candidate first reference lines along the compensation direction opposite to the prediction direction, wherein for at least one of one or more candidate first reference lines, a count of first reference pixels on the candidate first reference line is larger than a second predetermined threshold; and determining a target predicted value of the pixel based on the preliminary predicted value and the compensation predicted value.

In some embodiments, the determining the target predicted value of the pixel based on the preliminary predicted value and the compensation predicted value include determining a second weighting coefficient corresponding to the compensation predicted value of the pixel, wherein the second weighting coefficient is associated with a first global distance between the pixel and a first global projection location corresponding to the preliminary predicted value and a second global distance between the pixel and a second global projection location corresponding to the compensation predicted value; determining a first weighting coefficient corresponding to the preliminary predicted value of the pixel based on the second weighting coefficient; and determining the target predicted value of the pixel by weighting the preliminary predicted value and the compensation predicted value based on the first weighting coefficient and the second weighting coefficient.

A still further aspect of the present disclosure relates to a system for image coding. The system may include a predetermined region determination module, a prediction angle determination module, a preliminary predicted value determination module, a compensation predicted value determination module, and a target predicted value determination module. The predetermined region determination module may be configured to determine a predetermined region in a coding unit in an image, the predetermined region including a plurality of pixels. The prediction angle determination module may be configured to determine whether a prediction angle of a prediction mode is larger than or equal to 0° and smaller than or equal to 90°. In response to determining that the prediction angle of the prediction mode is larger than or equal to 0° and smaller than or equal to 90°, for each of the plurality of pixels in the predetermined region, the preliminary predicted value determination module may be configured to determine a preliminary predicted value of the pixel based on at least one of one or more first reference lines associated with the coding unit along a prediction direction corresponding to the prediction angle, the one or more first reference lines being along a first side or a second side of the coding unit and each of the one or more first reference lines including a plurality of first reference pixels; the compensation predicted value determination module may be configured to determine a compensation predicted value of the pixel based on at least one of one or more second reference lines associated with the coding unit along a compensation direction opposite to the prediction direction, the one or more second reference lines being along a third side or a fourth side of the coding unit and each of the one or more second reference lines including a plurality of second reference pixels; and the target predicted value determination module may be configured to determine a target predicted value of the pixel based on the preliminary predicted value and the compensation predicted value.

In some embodiments, the predetermined region may include an active boundary parallel to a target side of the coding unit. The active boundary may be larger than a centerline between the target side and a side of the coding unit parallel to the target side and less than the side parallel to the target side.

In some embodiments, the at least one of the one or more second reference lines may be determined by determining an intersection second reference pixel located at an intersection area of the third side and the fourth side of the coding unit based on one or more first reference pixels located at an intersection area of the first side and the fourth side, one or more first reference pixels located at an intersection area of the second side and the third side, a height of the coding unit, and a width of the coding unit; and determining a second reference line along the third side including the intersection second reference pixel and remainder second reference pixels determined based on the intersection second reference pixel, the one or more first reference pixels located at the intersection area of the second side and the third side, and the height of the coding unit; or determining a second reference line along the fourth side including the intersection second reference pixel and remainder second reference pixels determined based on the intersection second reference pixel, the one or more first reference pixels located at the intersection area of the first side and the fourth side, and the width of the coding unit.

In some embodiments, to determine the compensation predicted value of the pixel based on the at least one of one or more second reference lines associated with the coding unit along the compensation direction, the compensation predicted value determination module may be further configured to determine at least one target second reference line along a target side of the coding unit based on the compensation direction; determine, for each of the at least one target second reference line, an initial compensation predicted value corresponding to the pixel; and determine the compensation predicted value of the pixel based on at least one initial compensation projected value corresponding to the at least one target second reference line.

In some embodiments, for each of the at least one target second reference line, to determine the initial compensation predicted value corresponding to the pixel, the compensation predicted value determination module may be further configured to determine whether the compensation direction intersects the target side and determine, in response to determining that the compensation direction intersects the target side, for each of the at least one target second reference line, the initial compensation predicted value corresponding to the pixel based on at least one of the plurality of second reference pixels on the target second reference line.

In some embodiments, to determine the initial compensation predicted value corresponding to the pixel based on at least one of the plurality of second reference pixels on the target second reference line, the compensation predicted value determination module may be further configured to determine a projected pixel corresponding to the pixel on the target second reference line along the compensation direction and determine the initial compensation predicted value corresponding to the pixel based on the projected pixel.

In some embodiments, to determine the initial compensation predicted value corresponding to the pixel based on at least one of the plurality of second reference pixels on the target second reference line, the compensation predicted value determination module may be further configured to determine two second reference pixels corresponding to the pixel on the target second reference line along the compensation direction and determine the initial compensation predicted value corresponding to the pixel by performing an interpolation on the two second reference pixels.

In some embodiments, for each of the at least one target second reference line, to determine the initial compensation predicted value corresponding to the pixel, the compensation predicted value determination module may be further configured to determine, in response to determining that the compensation direction does not intersect the target side, at least one candidate second reference line along a candidate side of the coding unit, wherein the compensation direction intersects the candidate side and each of the at least one candidate second reference line corresponds to a respective one of the at least one target second reference line; determine, for each of the at least one candidate second reference line, at least one candidate compensation pixel corresponding to the pixel on the candidate second reference line along the compensation direction; and determine, for each of the at least one target second reference line, the initial compensation predicted value corresponding to the pixel based on by mapping the corresponding at least one candidate compensation pixel onto an extension line of the target second reference line.

In some embodiments, in response to determining that the prediction angle of the prediction mode is smaller than 0° or larger than 90°, for each of the plurality of pixels in the predetermined region, the preliminary predicted value determination module may be further configured to determine the preliminary predicted value of the pixel based on at least one of one or more target first reference lines along the prediction direction corresponding to the prediction angle, wherein for at least one of one or more target first reference lines, a count of first reference pixels on the target first reference line is larger than a first predetermined threshold; the compensation predicted value determination module may be further configured to determine the compensation predicted value of the pixel based on at least one of one or more candidate first reference lines along the compensation direction opposite to the prediction direction, wherein for at least one of one or more candidate first reference lines, a count of first reference pixels on the candidate first reference line is larger than a second predetermined threshold; and the target predicted value determination module may be further configured to determine a target predicted value of the pixel based on the preliminary predicted value and the compensation predicted value.

In some embodiments, to determine the target predicted value of the pixel based on the preliminary predicted value and the compensation predicted value, the target predicted value determination module may be further configured to determine a second weighting coefficient corresponding to the compensation predicted value of the pixel, wherein the second weighting coefficient is associated with a first global distance between the pixel and a first global projection location corresponding to the preliminary predicted value and a second global distance between the pixel and a second global projection location corresponding to the compensation predicted value; determine a first weighting coefficient corresponding to the preliminary predicted value of the pixel based on the second weighting coefficient; and determine the target predicted value of the pixel by weighting the preliminary predicted value and the compensation predicted value based on the first weighting coefficient and the second weighting coefficient.

A still further aspect of the present disclosure relates to a non-transitory computer readable medium including executable instructions. When the executable instructions are executed by at least one processor, the executable instructions may direct the at least one processor to perform a method. The method may include determining a predetermined region in a coding unit in an image, the predetermined region including a plurality of pixels and determining whether a prediction angle of a prediction mode is larger than or equal to 0° and smaller than or equal to 90°. In response to determining that the prediction angle of the prediction mode is larger than or equal to 0° and smaller than or equal to 90°, for each of the plurality of pixels in the predetermined region, the method may further include determining a preliminary predicted value of the pixel based on at least one of one or more first reference lines associated with the coding unit along a prediction direction corresponding to the prediction angle, the one or more first reference lines being along a first side or a second side of the coding unit and each of the one or more first reference lines including a plurality of first reference pixels; determining a compensation predicted value of the pixel based on at least one of one or more second reference lines associated with the coding unit along a compensation direction opposite to the prediction direction, the one or more second reference lines being along a third side or a fourth side of the coding unit and each of the one or more second reference lines including a plurality of second reference pixels; and determining a target predicted value of the pixel based on the preliminary predicted value and the compensation predicted value.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
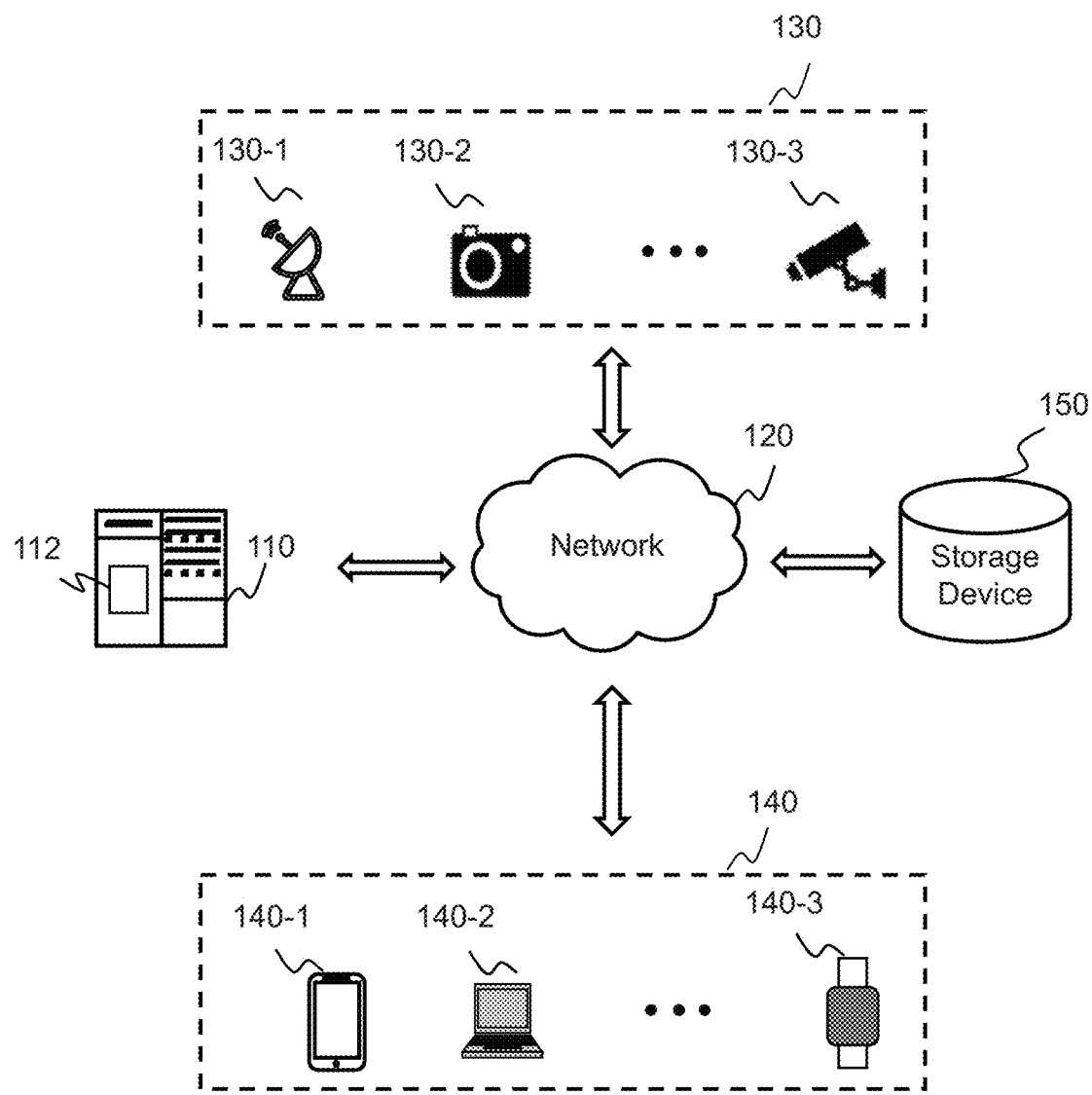
FIG. 1 is a schematic diagram illustrating an exemplary image coding system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "engine," "unit," "module," and/or "block" used herein are one method to distinguish different components, elements, parts, sections, or assemblies of different levels in ascending order. However, the terms may be displaced by other expression if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

An aspect of the present disclosure relates to systems and methods for image coding. The system may determine a predetermined region in a coding unit in an image. The predetermined region may include a plurality of pixels. For a prediction mode with a prediction angle larger than or equal to 0° and smaller than or equal to 90°, for each of the plurality of pixels (i.e., compensation pixels) in the predetermined region, the system may determine a preliminary predicted value of the pixel based on at least one of one or more first reference lines associated with the coding unit along a prediction direction corresponding to the prediction angle. The one or more first reference lines may be along a first side (e.g., a left side) or a second side (e.g., an upper side) of the coding unit and each of the one or more first reference lines may include a plurality of first reference pixels. Further, the system may determine a compensation predicted value of the pixel based on at least one of one or more second reference lines associated with the coding unit along a compensation direction opposite to the prediction direction. The one or more second reference lines may be along a third side (e.g., a right side) or a fourth side (e.g., a lower side) of the coding unit and each of the one or more second reference lines may include a plurality of second reference pixels. The system may then determine a target predicted value of the pixel by weighting the preliminary predicted value and the compensation predicted value based on a first weighting coefficient and a second weighting coefficient respectively, which may be determined based on a first global distance between the pixel and a first global projection location corresponding to the preliminary predicted value and a second global distance between the pixel and a second global projection location corresponding to the compensation predicted value, respectively.

According to the systems and methods of the present disclosure, reference lines in a third side (e.g., the right side) or a fourth side (e.g., the lower side) may be constructed, therefore, for the prediction mode with the prediction angle larger than or equal to 0° and smaller than or equal to 90°, a compensation predicted value can be determined for any pixel in the predetermined region. Further, for the preliminary predicted value and the compensation predicted value, a weighting coefficient is determined based on a distance between the pixel in the predetermined region and a projection location of the pixel on at least one of the reference lines, thereby improving the coding quality, the efficiency, and the accuracy of the image coding.

FIG. 1 is a schematic diagram illustrating an exemplary image coding system according to some embodiments of the present disclosure. As shown, the image coding system 100 may include a server 110, a network 120, an acquisition device 130, a user device 140, and a storage device 150.

The server 110 may be a single server or a server group. The server group may be centralized or distributed (e.g., the server 110 may be a distributed system). In some embodiments, the server 110 may be local or remote. For example, the server 110 may access information and/or data stored in the acquisition device 130, the user device 140, and/or the storage device 150 via the network 120. As another example, the server 110 may be directly connected to the acquisition device 130, the user device 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 of the present disclosure.

In some embodiments, the server 110 may include a processing device 112. The processing device 112 may process information and/or data relating to image coding to perform one or more functions described in the present disclosure. For example, the processing device 112 may determine a predetermined region in a coding unit in an image. For each of a plurality of pixels in the predetermined region, the processing device 112 may determine a preliminary predicted value and a compensation predicted value of the pixel. Further, the processing device 112 may determine a target predicted value of the pixel based on the preliminary predicted value and the compensation predicted value. In some embodiments, the processing device 112 may include one or more processing devices (e.g., single-core processing device(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiment, the sever 110 may be unnecessary and all or part of the functions of the server 110 may be implemented by other components (e.g., the acquisition device 130, the user device 140) of the image coding system 100. For example, the processing device 112 may be integrated into the acquisition device 130 or the user device 140 and the functions (e.g., determining the predetermined region in the coding unit in the image) of the processing device 112 may be implemented by the acquisition device 130 or the user device 140.

The network 120 may facilitate exchange of information and/or data for the image coding system 100. In some embodiments, one or more components (e.g., the server 110, the acquisition device 130, the user device 140, the storage device 150) of the image coding system 100 may transmit information and/or data to other component(s) of the image coding system 100 via the network 120. For example, the server 110 may obtain an image to be coded from the acquisition device 130 via the network 120. As another example, the server 110 may obtain a prediction mode associated with the image coding and a prediction angle of the prediction mode from the storage device 150. As a further example, the server 110 may transmit a coded image to the user device 140 via the network 120. In some embodiments, the network 120 may be any type of wired or wireless network, or combination thereof. Merely by way of example, the network 120 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof.

The acquisition device 130 may be configured to acquire an image (the "image" herein refers to a single image or a frame of a video). In some embodiments, the acquisition device 130 may include a camera 130-1, a video recorder 130-2, an image sensor 130-3, etc. The camera 130-1 may include a gun camera, a dome camera, an integrated camera, a monocular camera, a binocular camera, a multi-view camera, or the like, or any combination thereof. The video recorder 130-2 may include a PC Digital Video Recorder (DVR), an embedded DVR, or the like, or any combination thereof. The image sensor 130-3 may include a Charge Coupled Device (CCD), a Complementary Metal Oxide Semiconductor (CMOS), or the like, or any combination thereof. The image acquired by the acquisition device 130 may be a two-dimensional image, a three-dimensional image, a four-dimensional image, etc. In some embodiments, the acquisition device 130 may include a plurality of components each of which can acquire an image. For example, the acquisition device 130 may include a plurality of sub-cameras that can capture images or videos simultaneously. In some embodiments, the acquisition device 130 may transmit the acquired image to one or more components (e.g., the server 110, the user device 140, the storage device 150) of the image coding system 100 via the network 120.

The user device 140 may be configured to receive information and/or data from the server 110, the acquisition device 130, and/or the storage device 150 via the network 120. For example, the user device 140 may receive a coded image from the server 110. In some embodiments, the user device 140 may process information and/or data received from the server 110, the acquisition device 130, and/or the storage device 150 via the network 120. For example, the user device 140 may decode the coded image received from the server 110. In some embodiments, the user device 140 may provide a user interface via which a user may view information and/or input data and/or instructions to the image coding system 100. For example, the user may view the decoded image via the user interface. As another example, the user may input an instruction associated with an image coding parameter via the user interface. In some embodiments, the user device 140 may include a mobile phone 140-1, a computer 140-2, a wearable device 140-3, or the like, or any combination thereof. In some embodiments, the user device 140 may include a display that can display information in a human-readable form, such as text, image, audio, video, graph, animation, or the like, or any combination thereof. The display of the user device 140 may include a cathode ray tube (CRT) display, a liquid crystal display (LCD), a light emitting diode (LED) display, a plasma display panel (PDP), a three dimensional (3D) display, or the like, or a combination thereof. In some embodiments, the user device 140 may be connected to one or more components (e.g., the server 110, the acquisition device 130, the storage device 150) of the image coding system 100 via the network 120.

The storage device 150 may be configured to store data and/or instructions. The data and/or instructions may be obtained from, for example, the server 110, the acquisition device 130, the user device 140, and/or any other component of the image coding system 100. In some embodiments, the storage device 150 may store data and/or instructions that the server 110 may execute or use to perform exemplary methods described in the present disclosure. For example, the storage device 150 may store the prediction mode associated with the image coding and the prediction angle of the prediction mode. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components (e.g., the server 110, the acquisition device 130, the user device 140) of the image coding system 100. One or more components of the image coding system 100 may access the data or instructions stored in the storage device 150 via the network 120. In some embodiments, the storage device 150 may be directly connected to or communicate with one or more components (e.g., the server 110, the acquisition device 130, the user device 140) of the image coding system 100. In some embodiments, the storage device 150 may be part of other components of the image coding system 100, such as the server 110, the acquisition device 130, or the user device 140.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
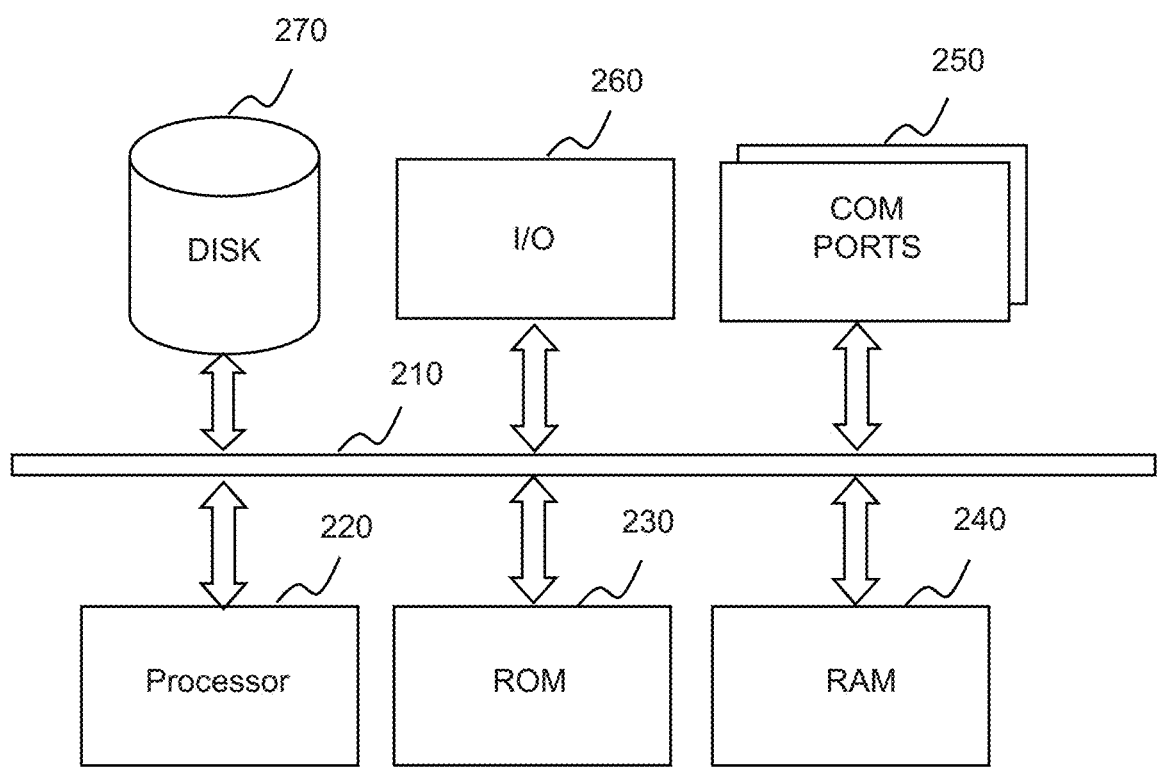
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110 may be implemented on the computing device 200. For example, the processing device 112 may be implemented on the computing device 200 and configured to perform functions of the processing device 112 disclosed in this disclosure.

The computing device 200 may be used to implement any component of the image coding system 100 as described herein. For example, the processing device 112 may be implemented on the computing device 200, via its hardware, software program, firmware, or a combination thereof. Although only one such computer is shown, for convenience, the computer functions relating to image coding as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read-only memory (ROM) 230, or a random-access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors 220 jointly or separately in the computing device 200 (e.g., a first processor executes step A and a second processor executes step B, or the first and second processors jointly execute steps A and B).

Figure 3:
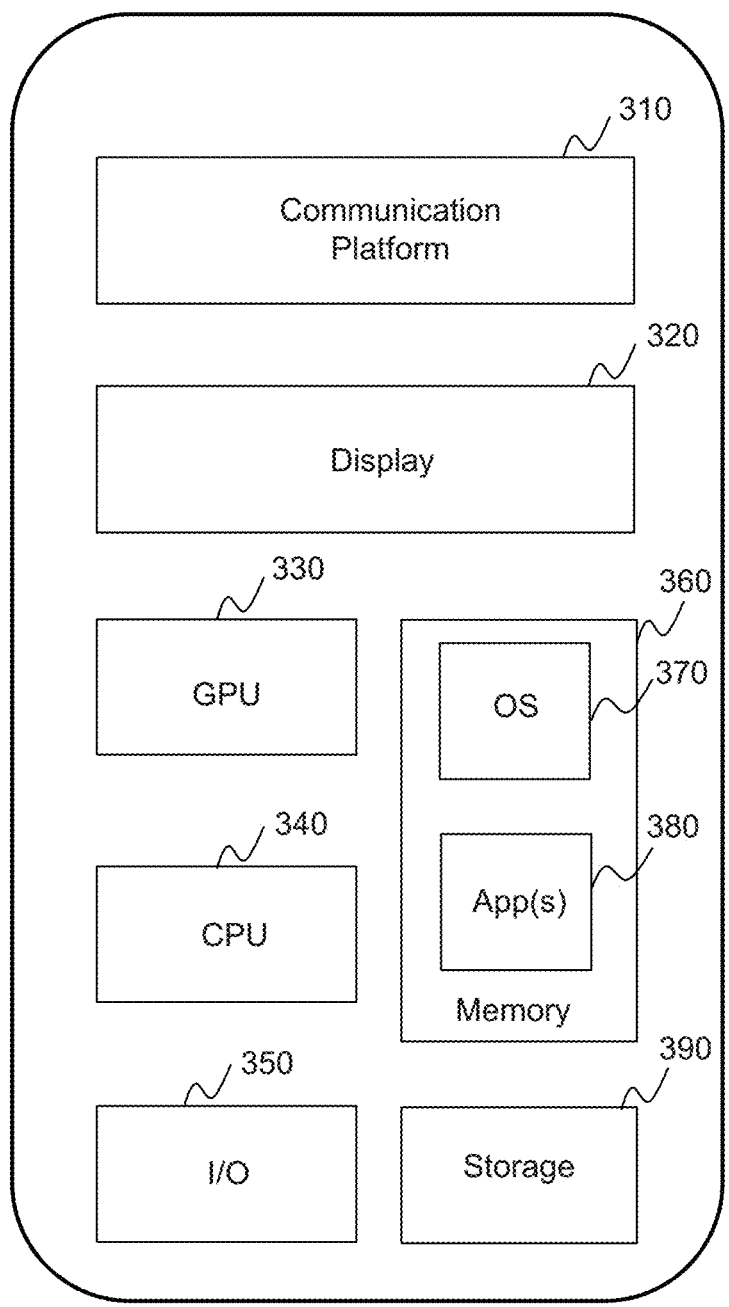
FIG. 3 is a schematic diagram illustrating exemplary hardware and/or software components of an exemplary terminal device according to some embodiments of the present disclosure.

FIG. 3 is a schematic diagram illustrating exemplary hardware and/or software components of an exemplary terminal device according to some embodiments of the present disclosure. In some embodiments, the user device 140 may be implemented on the terminal device 300 shown in FIG. 3.

As illustrated in FIG. 3, the terminal device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the terminal device 300.

In some embodiments, an operating system 370 (e.g., iOS™, Android™, Windows Phone™) and one or more applications (Apps) 380 may be loaded into the memory 360 from the storage 390 in order to be executed by the CPU 340. The applications 380 may include a browser or any other suitable mobile apps for receiving and rendering information relating to image coding or other information from the processing device 112. User interactions may be achieved via the I/O 350 and provided to the processing device 112 and/or other components of the image coding system 100 via the network 120.

Figure 4:
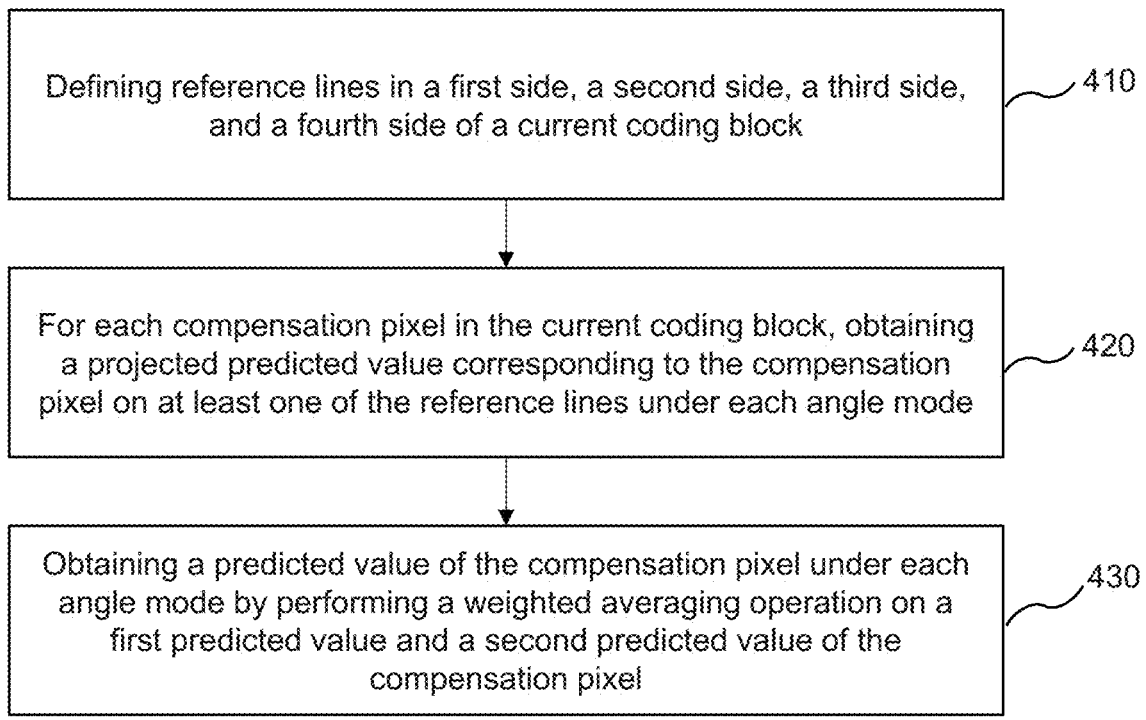
FIG. 4 is a flowchart illustrating an exemplary process for intra prediction according to some embodiments of the present disclosure.

FIG. 4 is a flowchart illustrating an exemplary process for intra prediction according to some embodiments of the present disclosure. In some embodiments, the process 400 may be implemented as a set of instructions (e.g., an application) stored in the storage ROM 230 or RAM 240. The processor 220 and/or the modules in FIG. 12 may execute the set of instructions, and when executing the instructions, the processor 220 and/or the modules may be configured to perform the process 400. The operations of the illustrated process presented below are intended to be illustrative. In some embodiments, the process 400 may be accomplished with one or more additional operations not described and/or without one or more of the operations herein discussed. Additionally, the order in which the operations of the process as illustrated in FIG. 4 and described below is not intended to be limiting.

In 410, reference lines may be defined in a first side (e.g., a left side), a second side (e.g., an upper side), a third side (e.g., a right side), and a fourth side (e.g., a lower side) of a current coding block (also referred to as a "coding unit (CU)," a "current block," or a "current predicted block"). As used herein, the current coding block may refer to a block to be encoded in an image. In some embodiments, the reference lines may be defined by the processing device 112 (e.g., a preliminary predicted value determination module 1230 or a compensation predicted value determination module 1240 illustrated in FIG. 12) (e.g., the processing circuits of the processor 220). In some embodiments, the reference lines in the first side and the second side of the current coding block may be collectively referred to as first reference lines; the reference lines in the third side and the fourth side of the current coding block may be collectively referred to as second reference lines.

In some embodiments, the first side and the second side may be adjacent to each other; the third side and the fourth side may be adjacent to each other. As used herein, "adjacent" refers to "not parallel." In some embodiments, the first side and the second side may be in a coding direction of the current coding block, which means that a coding order of at least part of coding blocks on the first side and the second side of the current coding block is before a coding order of the current coding block (i.e., at least part of coding blocks on the first side and the second side has been encoded when the current coding block is to be encoded). The third side and the fourth side of the current coding block may be in an opposite direction of the coding direction of the current coding block, which means that a coding order of coding blocks on the third side and the fourth side of the current coding block is after the coding order of the current coding block. For example, if a global coding order of the image is "from left to right and from top to bottom," the first side may be the left side of the current coding block and the second side may be the upper side of the current coding block or the first side may be the upper side of the current coding block and the second side may be the left side of the current coding block, accordingly, the third side may be the right side of the current coding block and the fourth side may be the lower side of the current coding block or the third side may be the lower side of the current coding block and the fourth side may be the right side of the current coding block.

In some embodiments, each of the reference lines (e.g., the first reference lines, the second reference lines) may include a plurality of reference pixels. A count of reference pixels on each of the reference lines may be a default setting of the image coding system 100 or may be adjustable (e.g., adjusted according to actual needs) under different situations. For example, a count (denoted as Mt) of reference pixels on a reference line closest to an upper boundary of the current coding block may be set as a*width and a count (denoted as Ml) reference pixels on a reference line closest to a left boundary of the current coding block may be set as b*height, wherein width refers to a width of the current coding block, height refers to a height of the current coding block, and a and b may be larger than or equal to 2. Further, for other reference lines in the upper side of the current coding block, a count of reference pixels on the reference line may be determined based on Mt; for other reference lines in the left side of the current coding block, a count of reference pixels on the reference line may be determined based on Ml. As another example, since the reference lines (i.e., the second reference lines) in the lower side and the right side of the current coding block are not encoded, for at least part of the second reference lines, a count of reference pixels on the second reference line may be relatively small, for example, a count (denoted as Mw) of reference pixels on a reference line closest to a lower boundary of the current coding block may be set as width+2 and a count (denoted as Mr) of reference pixels on a reference line closest to a right boundary of the current coding block may be set as height+2. Further, for other reference lines in the lower side of the current coding block, a count of reference pixels on the reference line may be determined based on Mw; for other reference lines in the right side of the current coding block, a count of reference pixels on the reference line may be determined based on Mr.

In some embodiments, for each of the reference lines (e.g., the first reference lines, the second reference lines), reference pixel values (also can be referred to as "pixel values" for brevity) corresponding to reference pixels on the reference line may be determined before subsequent operations are executed. The reference pixel values corresponding to the reference pixels may be determined based on pixel value(s) of encoded pixel(s) (i.e., pixels that have been encoded).

In some embodiments, for each of the reference lines (i.e., the first reference lines) in the first side and the second side of the current coding block, reference pixel values corresponding to reference pixels on the reference line may be determined successively according to a specified direction (e.g., from bottom to top and from left to right). For each reference pixel on the reference line, when a pixel value of a reference pixel is determined to be unavailable (i.e., the reference pixel has not been encoded), whether the reference pixel is the first reference pixel on the reference line may be determined. In response to a determination that the reference pixel is not the first reference pixel, the reference pixel value corresponding to the reference pixel may be determined to be a pixel value of a previous reference pixel according to the specified direction; in response to a determination that the reference pixel is the first reference pixel, a first available pixel value may be determined according to the specified direction and reference pixel values corresponding to reference pixels from the first reference pixel to a reference pixel corresponding to the first available pixel value may be determined to be the first available pixel value.

In some embodiments, since the reference lines (i.e., the second reference lines) in the third side and the fourth side of the current coding block have not been encoded, for each of the second reference lines, reference pixel values corresponding to reference pixels on the reference line may be constructed based on the reference pixel values corresponding to the reference pixels on at least part of the first reference lines. More descriptions regarding the reference pixel values corresponding to the reference lines in the third side and the fourth side of the current coding block may be found elsewhere in the present disclosure (e.g., FIG. 5, FIG. 14, and the descriptions thereof).

In some embodiments, after the reference pixel values corresponding to the reference pixels on each of the reference lines are determined, whether a filtering operation needs to be performed on the reference pixels may be determined. As used herein, the filtering operation may be used to avoid or reduce a direction boundary (e.g., a directional stripe) which may occur in a predicted block corresponding to the coding block determined based on the reference pixels, thereby reducing noises. In some embodiments, whether a filtering operation needs to be performed on the reference pixels may be determined based on a size of the current coding block and/or information (e.g., a prediction angle) relating to an intra prediction mode (also referred to as a "prediction mode") associated with the current coding block. For example, the smaller the size of the current coding block is, the less likely that the filtering operation needs to be performed. As another example, if the size of the current coding block is less than a threshold, there is no need to perform the filtering operation on the reference pixels. As a further example, the closer the prediction angle of the intra prediction mode is to the horizontal direction or the vertical direction, the less likely that the filtering operation needs to be performed. As a still further example, if an angle between the prediction angle of the intra prediction model and the horizontal direction or the vertical direction is less than a threshold, there is no need to perform the filtering operation on the reference pixels. In some embodiments, the filtering operation may include a low pass filtering operation (e.g., a smoothing filtering operation). In some embodiments, for all the reference liens, the filtering operations may be the same or different.

In 420, for each compensation pixel in the current coding block, at least one projected predicted value corresponding to the compensation pixel on at least one of the reference lines under at least one angle mode (also referred to as an "angle prediction mode") may be obtained. In some embodiments, the projected predicted value corresponding to the compensation pixel may be obtained by the processing device 112 (e.g., the preliminary predicted value determination module 1230 or the compensation predicted value determination module 1240 illustrated in FIG. 12) (e.g., the processing circuits of the processor 220).

As used herein, the compensation pixel refers to a pixel within a compensation region (also referred to as a "predetermined region") in the current coding block, accordingly, pixels not within the compensation region in the current coding block may be referred to as non-compensation pixels. In some embodiments, the compensation region may be a default setting of the image coding system 100 or may be adjustable under different situations. For example, the compensation region may be any region not larger than the current coding block. In some embodiments, the compensation region may include an active boundary parallel to a target side of the coding block, wherein the active boundary is larger than a centerline between the target side and a side of the coding block parallel to the target side and less than the side parallel to the target side. More descriptions of the compensation region may be found elsewhere in the present disclosure (e.g., FIGS. 7A-9B and the descriptions thereof).

In some embodiments, the angle mode may include a plurality of prediction modes corresponding to a plurality of prediction directions (or prediction angles), which can be used to eliminate spatial redundancy of a coding block in different directions. For example, the angle mode may include a positive angle mode (e.g., an angle mode with a prediction angle smaller than 0° or larger than 90°), a negative angle mode (e.g., an angle mode with a prediction angle larger than 0° and smaller than 90°), and a zero angle mode (e.g., an angle mode (referred to as a "horizontal angle mode") with a prediction angle equal to 0° and an angle mode (referred to as a "vertical angle mode" with a prediction angle equal to 90°). In some embodiments, each angle mode corresponds to a specific sequence number within a range from 2 to H (H is an integer larger than 2), wherein the specific sequence number indicates the prediction direction of the angle mode. Accordingly, the sequence number of the negative angle mode is within a range from a sequence number of the horizontal angle mode to a sequence number of the vertical angle mode. More descriptions of the angle mode may be found elsewhere in the present disclosure (e.g., FIG. 6 and the description thereof).

In some embodiments, take a specific pixel p in the current coding block as an example, the projected predicted value corresponding to the pixel p on the at least one of the reference lines may include a first projected predicted value (also referred to as an "initial preliminary predicted value") in the prediction direction of the angle mode. Additionally or alternatively, if the pixel p satisfies a bidirectional prediction condition (i.e., the pixel p is within the compensation region), the projected predicted value of the pixel p on the at least one of the reference lines may further include a second projected predicted value (also referred to as an "initial compensation predicted value") in a direction (also referred to as a "compensation direction") opposite to the prediction direction of the angle mode.

In some embodiments, a first projection location of the pixel p on at least one of the reference lines may be determined by projecting the pixel p onto the reference line or an extension line of the reference line along the prediction direction of angle mode. Further, a "pixel value" corresponding to the first projection location may be determined as the first projected predicted value of the pixel p on the reference line. In some embodiments, the first projection location of the pixel p may be determined by identifying a projection location on the reference line or the extension line of the reference line according to a vector starting from the pixel p with a direction same as the prediction direction of the angle mode.

In some embodiments, a second projection location of the pixel p on at least one of the reference lines may be determined by projecting the pixel p onto the reference line or an extension line of the reference line along a direction opposite to the prediction direction of the angle mode. Further, a "pixel value" corresponding to the second projection location may be determined as the second projected prediction value of the pixel p on the reference line. In some embodiments, the second projection location of the pixel p may be determined by identifying a projection location on the reference line or the extension line of the reference line according to a vector starting from the pixel p with a direction opposite to the prediction direction of the angle mode (i.e., a difference between the direction of the angle mode and the direction of the vector is 180°).

In some embodiments, as mentioned above, regardless of a limit of an actual length of the reference line, a projection location (e.g., the first projection location or the second projection location) of a pixel may be located on the reference line or an extension line of the reference line. If a coordinate of the projection location is an integer (i.e., the projection location corresponds to an actual reference pixel on the reference line or a virtual reference pixel on the extension line of the reference line), a "pixel value" (i.e., a projected predicted value of the pixel) corresponding to the projection location may be determined to be a reference pixel value corresponding to the reference pixel (i.e., the actual reference pixel or the virtual reference pixel); if the coordinate of the projection location is not an integer (i.e., the projection location is located between two adjacent reference pixels on the reference line or the extension line of the reference line), the "pixel value" (i.e., the projected predicted value of the pixel) corresponding to the projection location may be determined based on an interpolation result of reference pixel values corresponding to the two adjacent reference pixels that are on the same reference line and adjacent to the projection location.

In some embodiments, if the projection location (e.g., the first projection location or the second projection location) of the pixel corresponds to a reference pixel (e.g., a virtual reference pixel of which a reference pixel value has not been determined) on the extension line of the reference line, the reference pixel value corresponding to the virtual reference pixel may be set as a reference pixel value corresponding to an actual reference pixel on the reference line closest to the virtual reference pixel or a "pixel value" corresponding to a projection location on another reference line adjacent to the reference line along the prediction direction (which corresponds to the first projection location) of the angle mode or the direction (which corresponds to the second projection location) opposite to the prediction direction of the angle mode.

In 430, for each compensation pixel in the current coding block, an angle mode predicted value (also referred to as a "target predicted value") of the compensation pixel under at least one angle mode may be obtained by performing a weighted averaging operation on a first predicted value (also referred to as a "preliminary predicted value") and a second predicted value (also referred to as a "compensation predicted value") of the compensation pixel. In some embodiments, the angle mode predicted value of the compensation pixel may be obtained by the processing device 112 (e.g., a target predicted value determination module 1250 illustrated in FIG. 12) (e.g., the processing circuits of the processor 220).

In some embodiments, the first predicted value may be obtained based on at least one first projected predicted value corresponding to the compensation pixel on the at least one of the reference lines in the prediction direction of the angle mode. The second predicted value may be obtained based on at least one second projected predicted value corresponding to the compensation pixel on the at least one of the reference lines in the direction opposite to the prediction direction of the angle mode. Specifically, when a count of the at least one first projected predicted value is equal to 1, the first predicted value may be equal to the single one first projected predicted value; when the count of the at least one first projected predicted value is larger than 1, the first predicted value may be a weighted average value of the at least one first projected predicted value. When a count of the at least one second projected predicted value is equal to 1, the second predicted value may be equal to the single one second projected predicted value; when the count of the at least one second projected predicted value is larger than 1, the second predicted value may be a weighted average value of the at least one second projected predicted value.

In some embodiments, a first weighting coefficient of the first predicted value may be negatively related to at least one first distance between the compensation pixel and at least one first projection location on the at least one of the reference lines and may be within a range from 0 to 1 (i.e., [0, 1]). A second weighting coefficient of the second predicted value may be negatively related to at least one second distance between the compensation pixel and at least one second projection location on the at least one of the reference lines and may be within a range from 0 to 1 (i.e., [0, 1]). For example, the first weighting coefficient and the second weighting coefficient may be determined according to formula (1) below:

$$\begin{cases} \gamma 2 = \alpha * d1/(d1 + d2) \\ \gamma 1 = 1 - \gamma 2 \end{cases} \quad (1)$$

where $\gamma 2$ refers to the second weighting coefficient of the second predicted value, $\gamma 1$ refers to the first weighting coefficient of the first predicted value, $\alpha$ refers to a weight influence factor of the second predicted value, d1 refers to a shortest one among the at least one first distance, and d2 refers to a shortest one among the at least one second distance. It can be seen that the first weighting coefficient and the second weighting coefficient are determined in a linear manner, however, it should be noted that the first weighting coefficient and the second weighting coefficient also can be determined in other manners, such as an exponential manner. In some embodiments, the at least one first distance and the at least one second distance may be determined using a similar triangle principle, a trigonometric function, etc.

According to the embodiments of the present disclosure, the first weighting coefficient of the first predicted value is negatively related to the at least one first distance (which is an actual distance between the compensation pixel and the first projection location) and the second weighting coefficient of the second predicted value is negatively related to the at least one second distance (which is an actual distance between the compensation pixel and the second projection location), that is, both a vertical distance and a horizontal distance between the compensation pixel and the first projection location or the second projection location are taken into consideration, which can improve the accuracy of the first weighting coefficient and the second weighting coefficient, improve the accuracy of the angle mode predicted value of the compensation pixel, and improve the effect of reducing the spatial redundancy of the current coding block. More descriptions regarding determining the predicted value of the compensation pixel under different angle modes may be found elsewhere in the present disclosure (e.g., FIGS. 7A-9B and the descriptions thereof).

In the present disclosure, reference lines in the third side and the fourth side of the current coding block are defined along a direction opposite to a coding direction. Therefore, a distribution range of reference pixels is expanded, so that for each compensation pixel in the current coding block, at least one second projected predicted value of the compensation pixel on at least one of the reference lines under each angle mode can be obtained, that is, a compensation operation can be performed on the compensation pixel and can be achieved under each angle mode, thereby improving the possibility of selecting an optimal intra prediction mode from a plurality of prediction modes and improving the effect of reducing the spatial redundancy of the current coding block. Particularly, for the zero angle mode or the negative angle mode, a direction opposite to the prediction direction of the angle mode points to the reference lines in the third side or the fourth side of the current coding block. Therefore, for any compensation pixel in the current coding block, a second projection location corresponding to the compensation pixel along the direction opposite to the prediction direction of the angle mode can be obtained on at least one of the reference lines in the third side or the fourth side, that is, a compensation operation can be achieved on the compensation pixel under the zero angle mode and the negative angle mode (which can't be achieved in prior art), thereby improving the image coding quality.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 5:
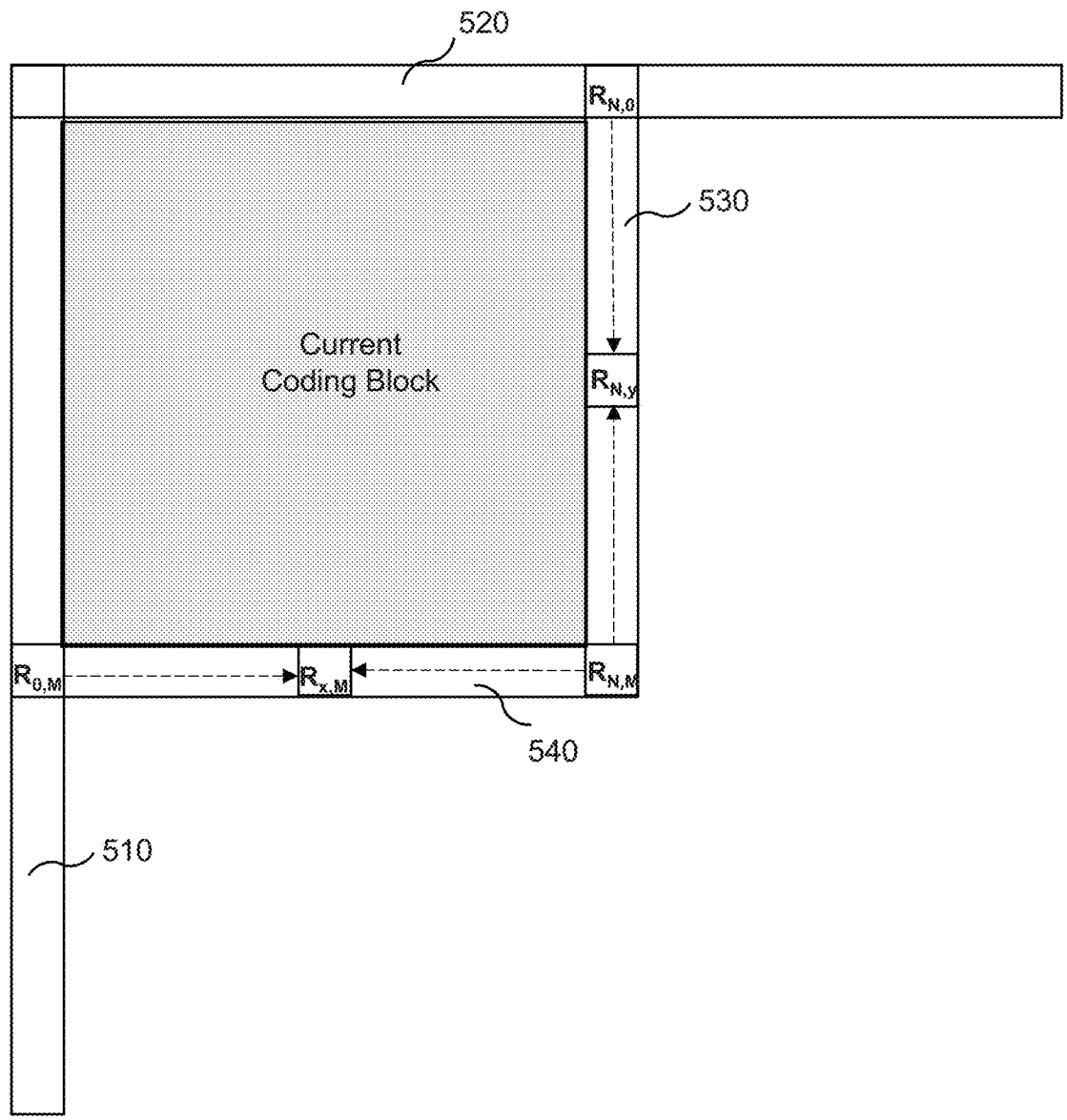
FIG. 5 is a schematic diagram illustrating exemplary reference lines associated with a current coding block according to some embodiments of the present disclosure.

FIG. 5 is a schematic diagram illustrating exemplary reference lines associated with a current coding block according to some embodiments of the present disclosure. It can be assumed that a coding direction of the image is "from left to right and from top to bottom," in this situation, the first side may be a left side and the second side may be an upper side or the first side may be the upper side and the second side may be the left side; similarly, the third side may be a right side and the fourth side may be a lower side or the third side may be the lower side and the fourth side may be the right side.

As illustrated in FIG. 5, the first side is the left side, the second side is the upper side, the third side is the right side, and the fourth side is the lower side. For convenience, it is assumed that for each of the four sides of the current coding block, there is only one reference line in the side, that is, a reference line 510 in the left side, a reference line 520 in the upper side, a reference line 530 in the right side, and a reference line 540 in the lower side. As described in connection with operation 410, reference pixel values corresponding to reference pixels on reference lines (i.e., the first reference lines) in the first side and the second side are determined based on pixel values of pixels that have been encoded and reference pixel values corresponding to reference pixels on reference lines (i.e., the second reference lines) in the third side and the fourth side are determined based on the reference pixel values corresponding to the reference pixels on the reference lines in the first side and the second side.

Specifically, a reference pixel value corresponding to a reference pixel (also referred to as an "intersection second reference pixel located at an intersection area of the third side and the fourth side") located at a lower right corner of the current coding block may be determined based on a reference pixel value corresponding to a reference pixel (also referred to as a "first reference pixel located at an intersection area of the first side and the fourth side") located at a lower left corner of the current coding block, a reference pixel value corresponding to a reference pixel (also referred to as a "first reference pixel located at an intersection area of the second side and the third side") located at an upper right corner of the current coding block, a height of the current coding block, and a width of the current coding block. For example, the reference pixel value corresponding to the reference pixel located at the lower right corner of the current coding block may be determined according to formula (2) below:

$$\begin{cases} R_{N,M} = (\text{width} \times R_{0,M} + \text{height} \times R_{N,0} + (1 \ll scale3) \gg 1) \gg scale3 \\ scale3 = \log_2(\text{width} + \text{height}) \end{cases} \quad (2)$$

where $R_{N,M}$ refers to the reference pixel value corresponding to the reference pixel located at the lower right corner, $R_{0,M}$ refers to the reference pixel value corresponding to the reference pixel located at the lower left corner, $R_{N,0}$ refers to the reference pixel value corresponding to the reference pixel located at the upper right corner, width refers to the width of the current coding block, height refers to the height of the current coding block, scale3 refers to an impact factor of the reference pixel value corresponding to the reference pixel located at the lower right corner, N=width+1, M=height+1, « refers to a left shift operator, and » is a right shift operator.

Further, for each of remainder reference pixels (i.e., reference pixels other than the reference pixel located at the lower right corner) on the reference line 530 in the right side, a reference pixel value corresponding to the remainder reference pixel may be determined based on the reference pixel value (i.e., $R_{N,M}$) corresponding to the reference pixel located at the lower right corner, the reference pixel value (i.e., $R_{N,0}$) corresponding to the reference pixel located at the upper right corner, the height of the current coding block, and a distance between the remainder reference pixel and the reference line 520 in the upper side. For example, the reference pixel value corresponding to the remainder reference pixel may be determined according to formula (3) below:

$$R_{N,y} = (y \times R_{N,M} + (\text{height} - y) \times R_{N,0} + (1 \ll scale1) \gg 1) \gg scale1$$

$$scale1 = \log_2(\text{height}) \quad (3),$$

where $R_{N,y}$ refers to the reference pixel value corresponding to the remainder reference pixel on the reference line 530, scale1 refers to an impact factor of the reference pixel value corresponding to the remainder reference pixel, y refers to the distance between the remainder reference pixel and the reference line 520, and y=1, 2, . . . , height.

Still further, for each of remainder reference pixels (i.e., reference pixels other than the reference pixel located at the lower right corner) on the reference line 540 in the lower side, a reference pixel value corresponding to the remainder reference pixel may be determined based on the reference pixel value (i.e., $R_{N,M}$) corresponding to the reference pixel located at the lower right corner, the reference pixel value (i.e., $R_{0,M}$) corresponding to the reference pixel located at the lower left corner, the height of the current coding block, and a distance between the remainder reference pixel and the reference line 510 in the left side. For example, the reference pixel value corresponding to the remainder reference pixel may be determined according to formula (4) below:

$$R_{x,M} = (x \times R_{N,M} + (\text{width} - x) \times R_{0,M} + (1 \ll scale2) \gg 1) \gg scale2$$

$$scale2 = \log_2(\text{width}) \quad (4),$$

where $R_{x,M}$ refers to the reference pixel value corresponding to the remainder reference pixel on the reference line 540, scale2 refers to an impact factor of the reference pixel value corresponding to the remainder reference pixel, x refers to the distance between the remainder reference pixel and the reference line 510, and x=1, 2, . . . , width. More descriptions regarding determining reference lines in the third side and the fourth side of the current coding block may be found elsewhere in the present disclosure (e.g., FIG. 14 and the description thereof).

Figure 6:
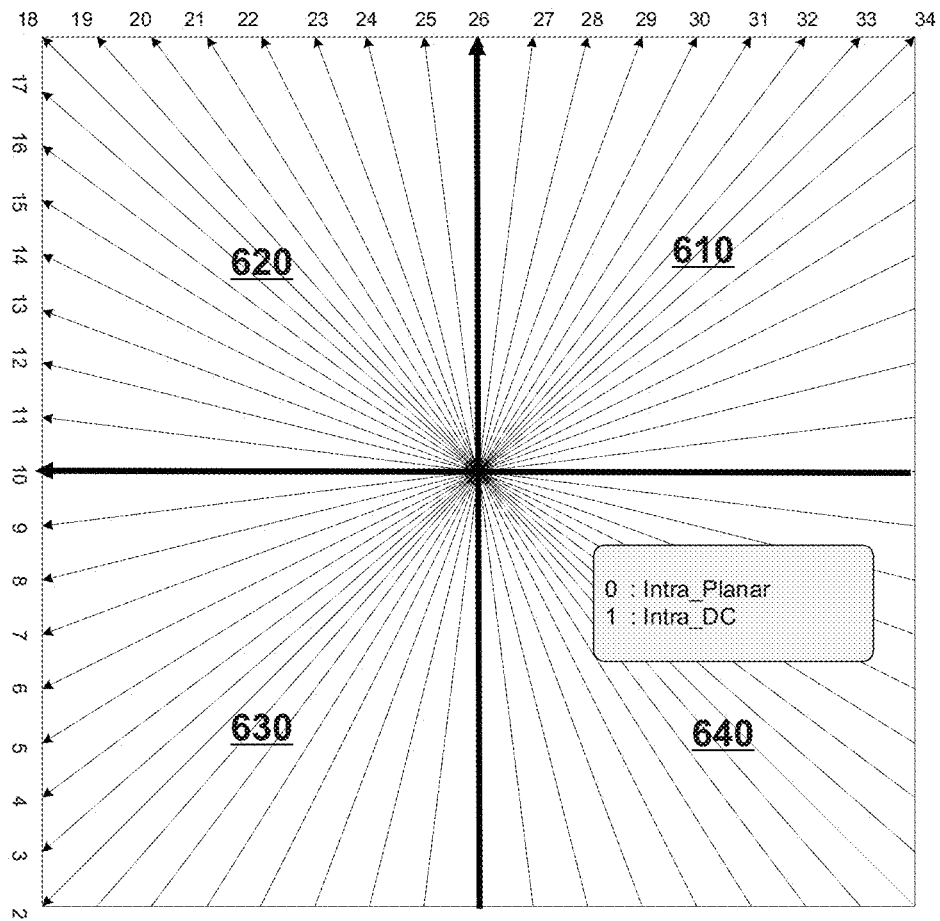
FIG. 6 is a schematic diagram illustrating exemplary angle modes with different sequence numbers according to some embodiments of the present disclosure.

FIG. 6 is a schematic diagram illustrating exemplary angle modes with different sequence numbers according to some embodiments of the present disclosure. As described in connection with operation 420, each angle mode corresponds to a specific sequence number within a range from 2 to H (H is an integer larger than 2). As illustrated in FIG. 6, it is assumed that H is equal to 34, a prediction direction of an angle mode with a sequence number "2" is a lower left direction (or a diagonal direction of a third quadrant 630), a prediction direction of an angle mode (which is a zero angle mode) with a sequence number "10" is a horizontal direction, a prediction direction of an angle mode with a sequence number "18" is an upper left direction (or a diagonal direction of a second quadrant 620), a prediction direction of an angle mode (which is a zero angle mode) with a sequence number "26" is a vertical direction, and a prediction direction of an angle mode with a sequence number "34" is an upper right direction (or a diagonal direction of a first quadrant 610). Further, angle modes with sequence numbers within a range from 2 to 9 and a range from 27 to 34 are positive angle modes and angle modes with sequence numbers within a range from 11 to 25 are negative angle modes. In some embodiments, the intra prediction mode may also include a DC prediction mode (also referred to as an "intra_DC mode"), a planar prediction mode (also referred to as an "intra_planar mode"), etc.

FIGS. 7A-9B are schematic diagrams illustrating exemplary operations for determining an angle mode predicted value of a compensation pixel under an angle mode according to some embodiments of the present disclosure. As illustrated, the first side is the left side, the second side is the upper side, the third side is the right side, and the fourth side is the lower side. For convenience, it is still assumed that for each of the four sides of the current coding block, there is only one reference line in the side, that is, a reference line LR in the first side, a reference line TR in the second side, a reference line RR in the third side, and a reference line FR in the fourth side. As described in connection with FIG. 4, for each compensation pixel (i.e., a pixel within a compensation region) in the current coding block, a first projection location of the compensation pixel on a reference line may be obtained by projecting the compensation pixel onto the reference line along a prediction direction (e.g., direction A) of an angle mode and a second projection location of the compensation pixel on a reference line may be obtained by projecting the compensation pixel onto the reference line along a direction (e.g., direction B) opposite to the prediction direction of the angle mode. Further, an angle mode projected value of the compensation pixel may be determined by performing a weighted averaging operation on a first predicted value corresponding to the prediction direction of the angle mode and a second predicted value corresponding to a direction opposite to the prediction direction. Since there is only one reference line in each of the four sides of the current coding block, the first predicted value is equal to a first projected predicted value which is determined based on a "pixel value" corresponding to the first projection location and the second predicted value is equal to a second projected predicted value which is determined based on a "pixel value" corresponding to the second projection location.

Figure 7A:
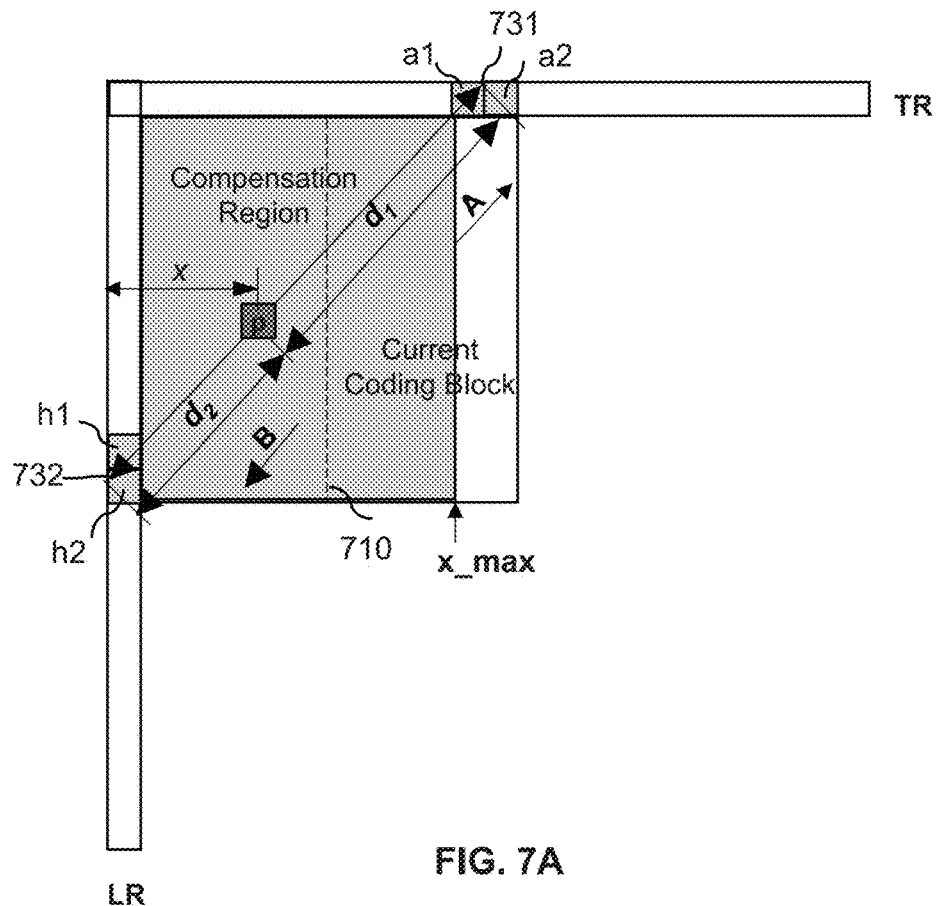
FIGS. 7A-9B are schematic diagrams illustrating exemplary operations for determining an angle mode predicted value of a compensation pixel under an angle mode according to some embodiments of the present disclosure.

As illustrated in FIG. 7A, for a positive angle mode with a prediction direction larger than 90° (i.e., for any compensation pixel, the first projection location is located on the reference line TR in the second side and the second projection location is located on the reference LR in the first side), the compensation region may be located on a left part (e.g., a grey area) of the current coding block. As illustrated, the compensation region may include an active boundary (e.g., x_max) parallel to a target side of the current coding block, wherein the target side refers to a side (e.g., the first side) where the reference line (e.g., LR) used to determine the second predicted value of the compensation pixel is located (i.e., the reference line where the second projection location is located). The active boundary (e.g., x_max) may be larger than a centerline (e.g., 710) between the target side (e.g., the first side) and a side (e.g., the third side) of the current coding block parallel to the target side and less than the side parallel to the target side.

Further, take a specific compensation pixel p in the compensation region as an example, an angle mode projected value of the compensation pixel p is determined by performing a weighted averaging operation on a first predicted value (i.e., a "pixel value" corresponding to a first projection location 731 of the compensation pixel p) and a second predicted value (i.e., a "pixel value" corresponding to a second projection location 732 of the compensation pixel p). If the first projection location 731 of the compensation pixel p corresponds to a reference pixel on the reference line TR, the first projected predicted value of the compensation pixel p may be determined to be equal to a reference pixel value corresponding to the reference pixel; if the first projection location 731 of the compensation pixel p is located between two adjacent reference pixels (e.g., reference pixels a1 and a2) on the reference line TR, the first projected predicted value of the compensation pixel p may be determined to be equal to an interpolation result of reference pixel values corresponding to the two adjacent reference pixels. Similarly, if a second projection location 732 of the compensation pixel p corresponds to a reference pixel on the reference line LR, the second projected predicted value of the compensation pixel p may be determined to be equal to a reference pixel value of the reference pixel; if the second projection location 732 of the compensation pixel p is located between two adjacent reference pixels (e.g., reference pixels h1 and h2) on the reference line LR, the second projected predicted value of the compensation pixel p may be determined to be equal to an interpolation result of reference pixel values corresponding to the two adjacent reference pixels.

After the first predicted value and the second predicted value are determined, the angle mode predicted value of the compensation pixel p may be obtained by performing the weighted averaging operation on the first predicted value and the second predicted value of the compensation pixel p based on a first weighting coefficient corresponding to the first predicted value and a second weighting coefficient corresponding to the second predicted value according to formula (1). Specifically, the first weighting coefficient and the second weighting coefficient may be determined based on a similar triangle principle according to formula (5) below:

$$\begin{cases} \gamma 2 = \alpha * \left( deltaInt + \dfrac{deltaFract}{N} \right) \Big/ \left( x + deltaInt + \dfrac{deltaFract}{N} \right) & \text{if } x \leq \text{x\_max} \\ \gamma 1 = 1 - \gamma 2 \\ \quad \text{else} \\ \gamma 2 = 0, \\ \gamma 1 = 1 \end{cases} \quad (5)$$

where x_max refers to the active boundary of the compensation region (i.e., a rightmost boundary of the compensation region) and a value range of x_max is [width/2, width−1], γ1 refers to the first weighting coefficient, γ2 refers to the second weighting coefficient, α refers to a weight influence factor of the second predicted value and a value range of α is [0, 1], x refers to a horizontal distance between the compensation pixel p and the reference line LR, deltaInt refers to a horizontal distance between the compensation pixel p and a corresponding reference pixel (which may be a reference pixel where the first projection location 731 is located or an a left pixel closest to the first projection location 731) on the reference line TR, deltaFract refers to a distance between the first projection location 731 of the compensation pixel p on the reference line TR and the left reference pixel closest to the first projection location 731 and a value range of deltaFract is [0, N−1], and N refers to an interpolation accuracy which may be a positive integer power of 2, such as 8, 16, 32, 64, etc.

Figure 7B:
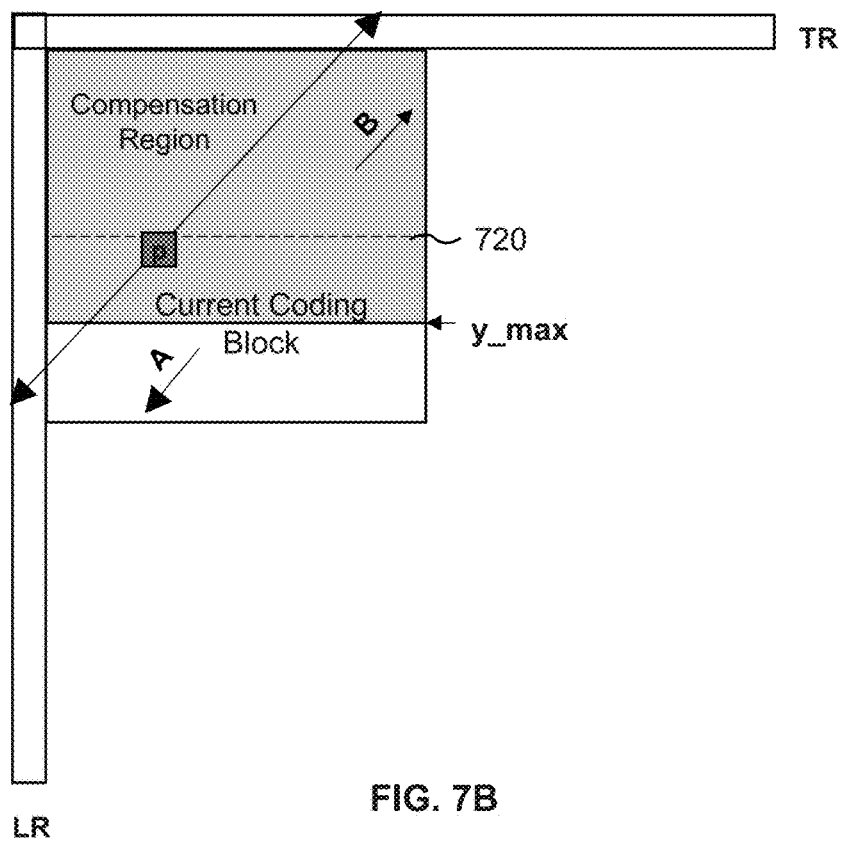

As illustrated in FIG. 7B, for a positive angle mode with a prediction direction less than 0° (i.e., for any compensation pixel, the first projection location is located on the reference line LR in the first side and the second projection location is located on the reference line TR in the second side), the compensation region may be located on an upper part (e.g., a grey area) of the current coding block. The active boundary (e.g., y_max) (i.e., a lowermost boundary) of the compensation region may be larger than a centerline (e.g., 720) between the target side (e.g., the second side) and a side (e.g., the fourth side) of the coding block parallel to the target side and less than the side parallel to the target side. A value range of y_max is [height/2, height−1]. The operations for determining the angle mode predicted value of the compensation pixel p are similar to those described in FIG. 7A and not repeated here.

Figure 8A:
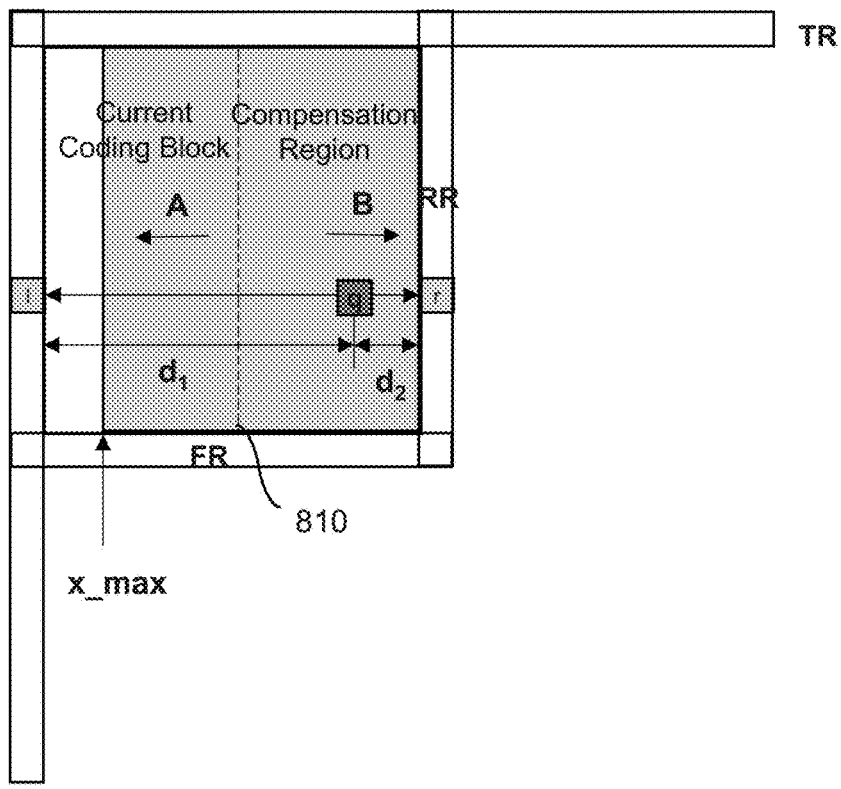

As illustrated in FIG. 8A, for a zero angle mode with a prediction direction equal to 0° (i.e., for any compensation pixel, the first projection location is located on the reference line LR in the first side and the second projection location is located on the reference RR in the third side), the compensation region may be located on a right part (e.g., a grey area) of the current coding block. The active boundary (e.g., x_max) (i.e., a leftmost boundary) of the compensation region may be larger than a centerline (e.g., 810) between the target side (e.g., the third side) and a side (e.g., the first side) of the coding block parallel to the target side and less than the side parallel to the target side. A value range of x_max is [0, width/2].

Further, take a specific compensation pixel q in the compensation region as an example, an angle mode projected value of the compensation pixel q is determined by performing a weighted averaging operation on a first predicted value (i.e., a "pixel value" corresponding to a first projection location i of the compensation pixel q) and a second predicted value (i.e., a "pixel value" corresponding to a second projection location r of the compensation pixel q). The first projected predicted value of the compensation pixel q may be determined to be equal to a reference pixel value corresponding to a reference pixel (e.g., l) on the reference line LR corresponding to the first projection location of the compensation pixel q. The second projected predicted value of the compensation pixel q may be determined to be equal to a reference pixel value corresponding to a reference pixel (e.g., r) on the reference line RR corresponding to the second projection location of the compensation pixel q.

After the first predicted value and the second predicted value are determined, the angle mode predicted value of the compensation pixel q may be obtained by performing the weighted averaging operation on the first predicted value and the second predicted value of the compensation pixel q based on a first weighting coefficient corresponding to the first predicted value and a second weighting coefficient corresponding to the second predicted value according to formula (1). Specifically, the first weighting coefficient and the second weighting coefficient may be determined according to formula (6) below:

$$\begin{cases} \text{if } x \geq x\_max \\ \gamma 2 = \alpha 1 * x / \text{width} \\ \gamma 1 = 1 - \gamma 2 \\ \text{else } \gamma 2 = 0, \ \gamma 1 = 1 \end{cases} \quad (6)$$

where x_max refers to the active boundary of the compensation region (i.e., a leftmost boundary of the compensation region) and a value range of x_max is [0, width/2], $\gamma 1$ refers to the first weighting coefficient, $\gamma 2$ refers to the second weighting coefficient, $\alpha 1$ refers to a weight influence factor of the second predicted value, x refers to a horizontal distance between the compensation pixel q and the reference line LR, and width refers to a width of the current coding block.

Figure 8B:
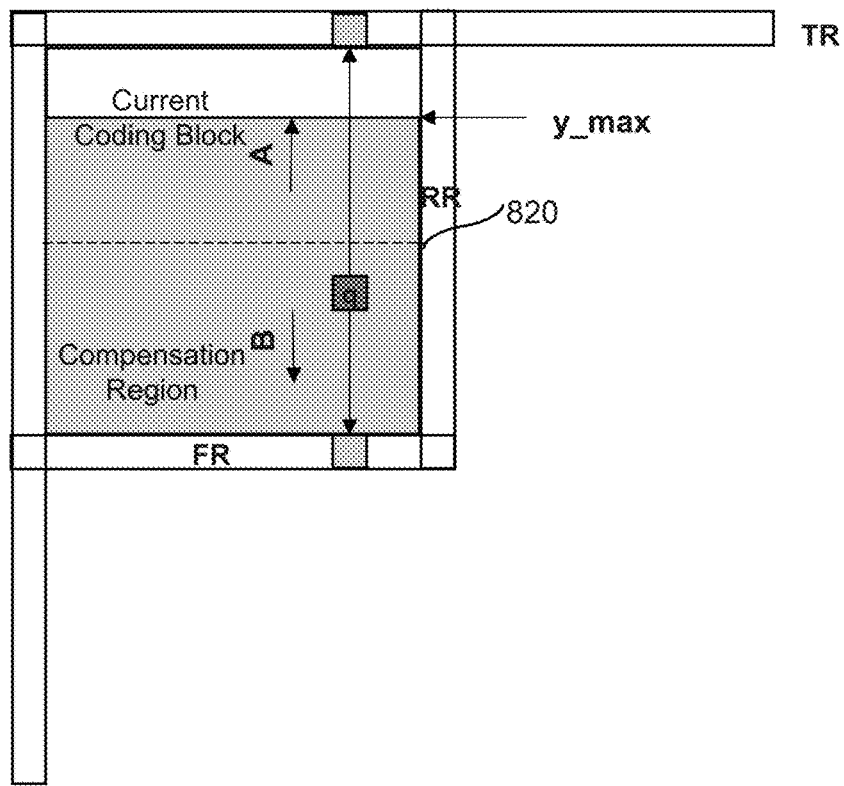

As illustrated in FIG. 8B, for a zero angle mode with a prediction direction equal to 90° (i.e., for any compensation pixel, the first projection location is located on the reference line TR in the second side and the second projection location is located on the reference FR in the fourth side), the compensation region may be located on a lower part (e.g., a grey area) of the current coding block. The active boundary (e.g., y_max) (i.e., an uppermost boundary) of the compensation region may be larger than a centerline (e.g., 820) between the target side (e.g., the fourth side) and a side (e.g., the second side) of the coding unit parallel to the target side and less than the side parallel to the target side. A value range of y_max is [0, height/2]. The operations for determining the angle mode predicted value of the compensation pixel q are similar to those described in FIG. 8A and not repeated here.

Figure 9A:
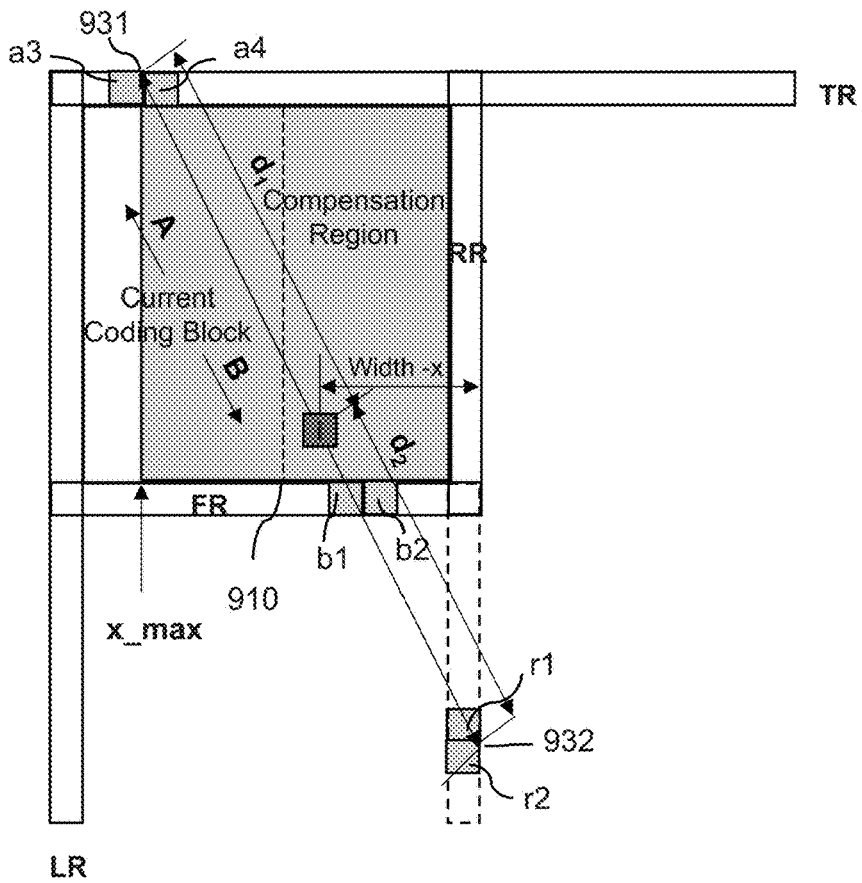

As illustrated in FIG. 9A, for a negative angle mode with a prediction direction larger than 45° and less than 90° (i.e., for any compensation pixel, the first projection location is located on the reference line TR in the second side and the second projection location is located on the reference RR in the third side), the compensation region may be located on a right part (e.g., a grey area) of the current coding block. The active boundary (e.g., x_max) (i.e., a leftmost boundary) of the compensation region may be larger than a centerline (e.g., 910) between the target side (e.g., the third side) and a side (e.g., the first side) of the coding unit parallel to the target side and less than the side parallel to the target side. A value range of x_max is [0, width/2].

Further, take the specific compensation pixel i in the compensation region as an example, an angle mode projected value of the compensation pixel i is determined by performing a weighted averaging operation on a first predicted value (i.e., a "pixel value" corresponding to a first projection location 931 of the compensation pixel i) and a second predicted value (i.e., a "pixel value" corresponding to a second projection location 932 of the compensation pixel i). If the first projection location 931 of the compensation pixel i corresponds to a reference pixel on the reference line TR, the first projected predicted value of the compensation pixel i may be determined to be equal to a reference pixel value corresponding to the reference pixel; if the first projection location 931 of the compensation pixel i is located between two adjacent reference pixels (e.g., reference pixels a3 and a4) on the reference line TR, the first projected predicted value of the compensation pixel i may be determined to be equal to an interpolation result of reference pixel values corresponding to the two adjacent reference pixels. Similarly, if a second projection location 932 of the compensation pixel i corresponds to a virtual reference pixel on an extension line of the reference line RR, a mapping reference pixel of the virtual reference pixel on the reference line FR may be determined by mapping the virtual reference pixel onto the reference line FR along the prediction direction (e.g., direction A) of the angle mode and the second projected predicted value of the compensation pixel i may be determined to be equal to a reference pixel value corresponding to the mapping reference pixel. If the second projection location 932 of the compensation pixel i is located between two adjacent virtual reference pixels (e.g., virtual reference pixels r1 and r2) on the extension line of the reference line RR, two adjacent mapping reference pixel (e.g., b1 corresponding to r1 and b2 corresponding to r2) of the two adjacent virtual reference pixel on the reference line FR may be determined by mapping the two adjacent virtual reference pixels onto the reference line FR along the prediction direction (e.g., direction A) of the angle mode and the second projected predicted value of the pixel i may be determined to be equal to an interpolation result of reference pixel values corresponding to the two adjacent mapping reference pixels.

After the first predicted value and the second predicted value are determined, the angle mode predicted value of the compensation pixel i may be obtained by performing the weighted averaging operation on the first predicted value and the second predicted value of the compensation pixel i based on a first weighting coefficient corresponding to the first predicted value and a second weighting coefficient corresponding to the second predicted value according to formula (1). Specifically, the first weighting coefficient and the second weighting coefficient may be determined based on a similar triangle principle according to formula (7) below:

$$\text{if } x \geq x\_max \quad (7)$$
$$\gamma 2 = \alpha 2 * \left(deltaInt - \frac{deltaFract}{N}\right) \Big/ \left(width - x + deltaInt - \frac{deltaFract}{N}\right)$$
$$\gamma 1 = 1 - \gamma 2$$
$$\text{else } \gamma 2 = 0, \gamma 1 = 1$$

where x_max refers to the active boundary of the compensation region (i.e., a leftmost boundary of the compensation region) and a value range of x_max is [0, width/2], γ1 refers to the first weighting coefficient, γ2 refers to the second weighting coefficient, and α2 refers to a weight influence factor of the second predicted value and a value range of α2 is [0, 1], x refers to a horizontal distance between the compensation pixel i and the reference line LR, deltaInt refers to a horizontal distance between the compensation pixel i and a corresponding reference pixel (which may be a reference pixel where the first projection location 931 is located or an a left pixel closest to the first projection location 931) on the reference line TR, deltaFract refers to a distance between the first projection location 931 of the compensation pixel i on the reference line TR and the left reference pixel closest to the first projection location 931 and a value range of deltaFract is [0, N−1], and N refers to an interpolation accuracy which may be a positive integer power of 2, such as 8, 16, 32, 64, etc.

Figure 9B:
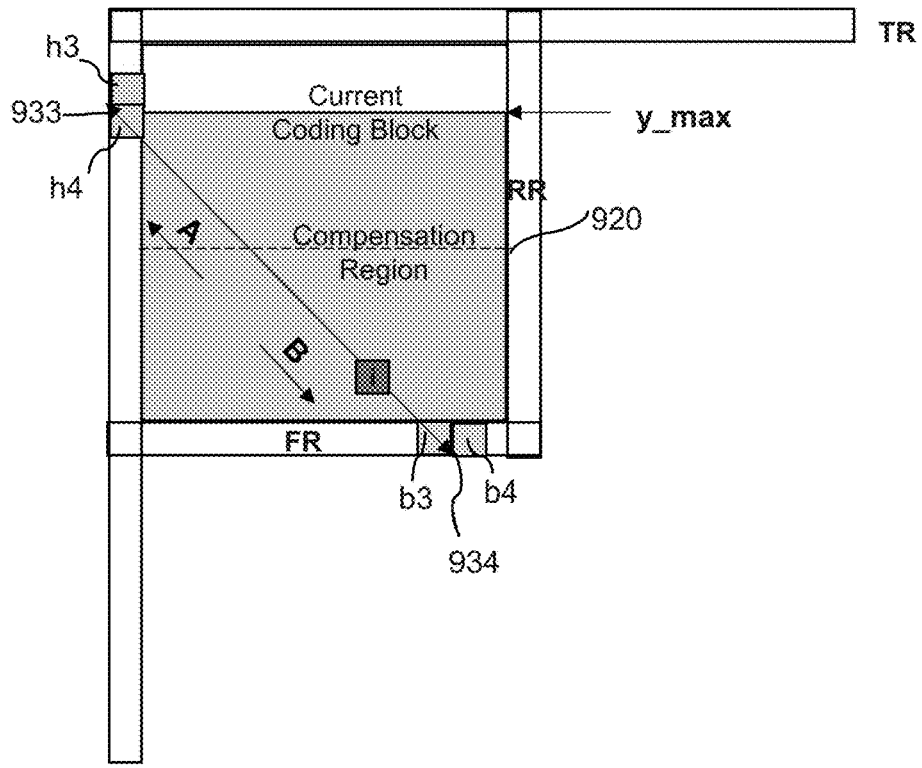

As illustrated in FIG. 9B, for a negative angle mode with a prediction direction larger than 0° and less than 45° (i.e., for any compensation pixel, the first projection location is located on the reference line LR in the first side and the second projection location is located on the reference FR in the fourth side), the compensation region may be located on a lower part (e.g., a grey area) of the current coding block. The active boundary (e.g., y_max) (i.e., an uppermost boundary) of the compensation region may be larger than a centerline (e.g., 920) between the target side (e.g., the fourth side) and a side (e.g., the second side) of the coding unit parallel to the target side and less than the side parallel to the target side. A value range of y_max is [0, height/2].

Further, still take the specific compensation pixel i in the current coding block as an example, if a first projection location 933 of the compensation pixel i corresponds to a reference pixel on the reference line LR, a first projected predicted value of the compensation pixel i may be determined to be equal to a reference pixel value corresponding to the reference pixel; if the first projection location 933 of the compensation pixel i is located between two adjacent reference pixels (e.g., reference pixels h3 and h4) on the reference line LR, the first projected predicted value of the compensation pixel i may be determined to be equal to an interpolation result of reference pixel values corresponding to the two adjacent reference pixels. Similarly, if a second projection location 934 of the compensation pixel i corresponds to a reference pixel on the reference line FR, a second projected predicted value of the compensation pixel i may be determined to be equal to a reference pixel value corresponding to the reference pixel; if the second projection location 934 of the compensation pixel i is located between two adjacent reference pixels (e.g., reference pixels b3 and b4) on the reference line FR, the second projected predicted value of the pixel i may be determined to be equal to an interpolation result of reference pixel values corresponding to the two adjacent reference pixels.

Similarly, after the first predicted value and the second predicted value are determined, the angle mode predicted value of the compensation pixel i may be obtained by performing the weighted averaging operation on the first predicted value and the second predicted value of the compensation pixel i based on a first weighting coefficient corresponding to the first predicted value and a second weighting coefficient corresponding to the second predicted value.

Figure 10:
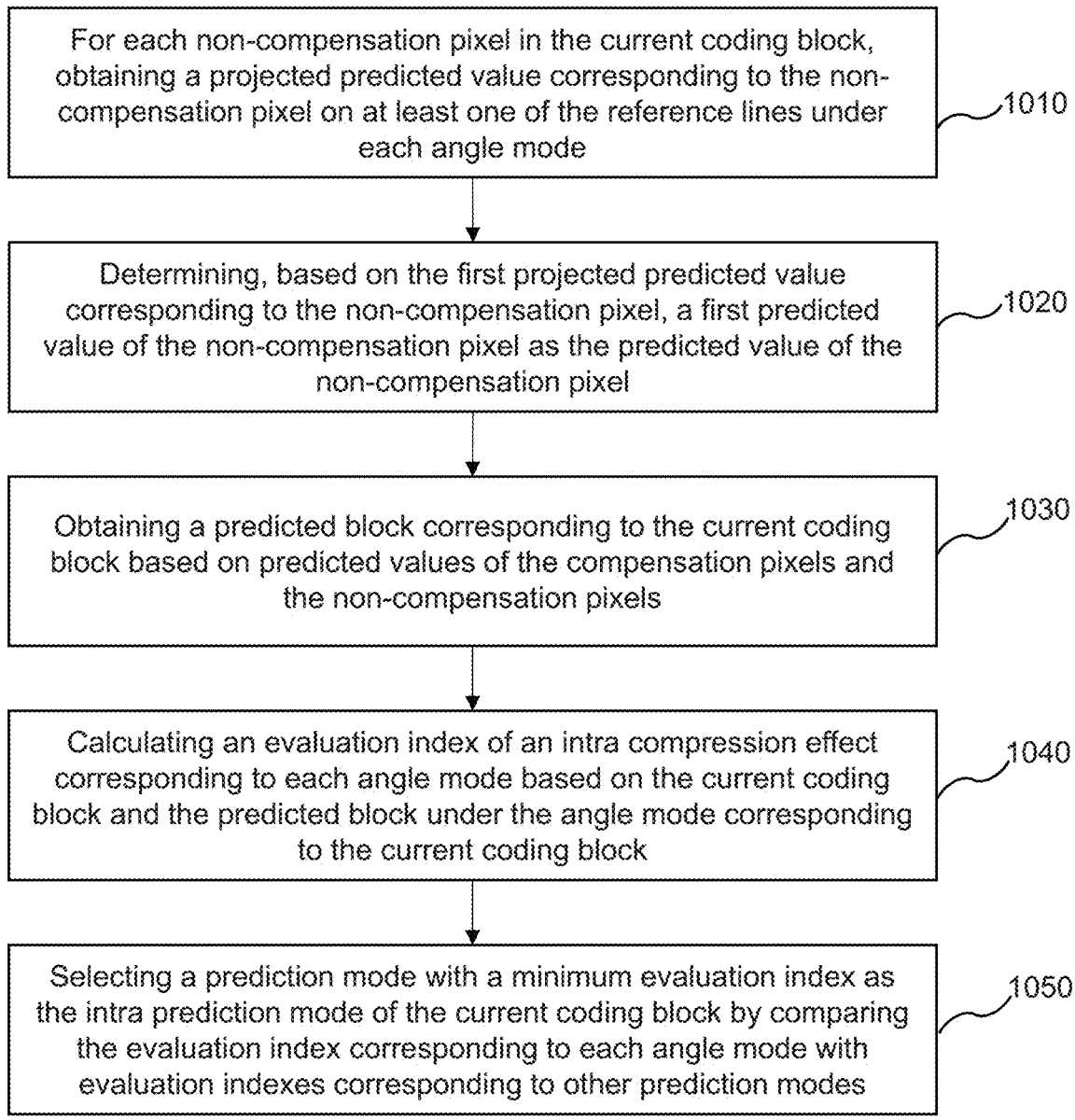
FIG. 10 is a flowchart illustrating an exemplary process for intra prediction according to some embodiments of the present disclosure.

FIG. 10 is a flowchart illustrating an exemplary process for intra prediction according to some embodiments of the present disclosure. In some embodiments, the process 1000 may be implemented as a set of instructions (e.g., an application) stored in the storage ROM 230 or RAM 240. The processor 220 and/or the modules in FIG. 12 may execute the set of instructions, and when executing the instructions, the processor 220 and/or the modules may be configured to perform the process 1000. The operations of the illustrated process presented below are intended to be illustrative. In some embodiments, the process 1000 may be accomplished with one or more additional operations not described and/or without one or more of the operations herein discussed. Additionally, the order in which the operations of the process as illustrated in FIG. 10 and described below is not intended to be limiting.

In 1010, for each non-compensation pixel in the current coding block, at least one projected predicted value corresponding to the non-compensation pixel on at least one of the reference lines under at least one angle mode may be obtained. In some embodiments, the at least one projected predicted value corresponding to the non-compensation pixel may be obtained by the processing device 112 (e.g., the preliminary predicted value determination module 1230 or the target predicted value determination module 1250 illustrated in FIG. 12) (e.g., the processing circuits of the processor 220). Since the non-compensation pixel is not within the compensation region, the at least one projected predicted value corresponding to the non-compensation pixel is at least one first projected predicted value in a prediction direction of the angle mode.

In 1020, a first predicted value of the non-compensation pixel may be determined based on the at least one first projected predicted value corresponding to the non-compensation pixel and then the first predicted value may be determined as an angle mode predicted value of the non-compensation pixel. In some embodiments, the first predicted value of the non-compensation pixel may be determined by the processing device 112 (e.g., the preliminary predicted value determination module 1230 or the target predicted value determination module 1250 illustrated in FIG. 12) (e.g., the processing circuits of the processor 220). In some embodiments, when the count of the at least one first projected predicted value is equal to 1, the first predicted value may be equal to the single one first projected predicted value; when the count of the at least one first projected predicted value is larger than 1, the first predicted value may be a weighted average value of the at least one first projected predicted value.

In 1030, a predicted block corresponding to the current coding block may be obtained based on angle mode predicted values of the compensation pixels and the non-compensation pixels. In some embodiments, the predicted block corresponding to the current coding block may be obtained by the processing device 112 (e.g., the target predicted value determination module 1250 illustrated in FIG. 12) (e.g., the processing circuits of the processor 220). A count of pixels of the predicted block corresponding to the current coding block may be the same as a count of pixels of the current coding block and a pixel value of each pixel in the predicted block may be the predicted value of the pixel in the current coding block.

In 1040, for each of the at least one angle mode, an evaluation index (e.g., a rate-distortion (RD) cost) of an intra compression effect corresponding to the angle mode may be determined based on the current coding block and the predicted block determined under the angle mode. In some embodiments, the evaluation index of the intra compression effect may be determined by the processing device 112 (e.g., the target predicted value determination module 1250 illustrated in FIG. 12) (e.g., the processing circuits of the processor 220).

In 1050, a prediction mode with a minimum evaluation index may be selected as the intra prediction mode of the current coding block by comparing the evaluation indexes corresponding to the at least one angle mode. In some embodiments, the prediction mode with the minimum evaluation index may be selected by the processing device 112 (e.g., the target predicted value determination module 1250 illustrated in FIG. 12) (e.g., the processing circuits of the processor 220).

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 11:
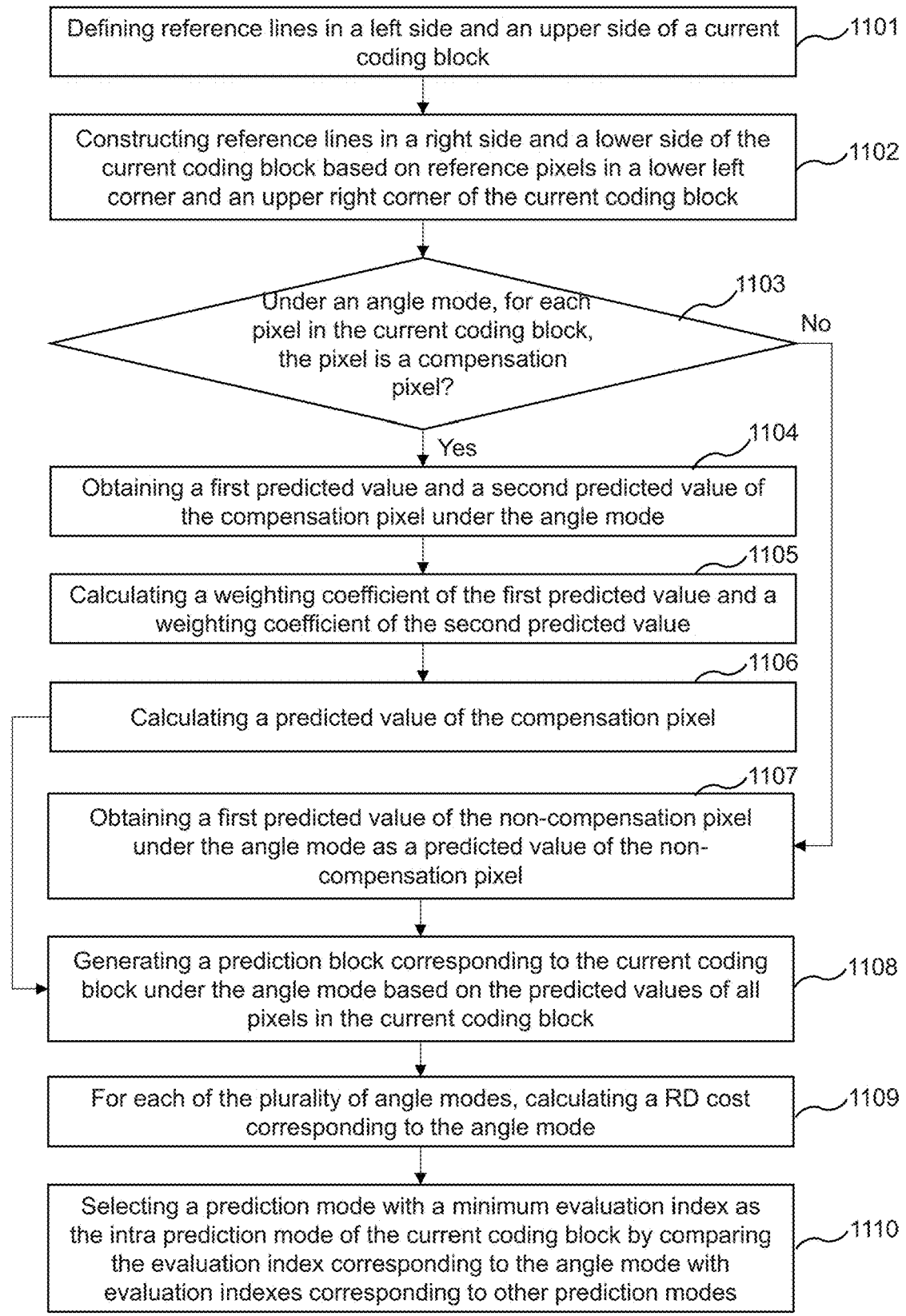
FIG. 11 is a flowchart illustrating an exemplary process for intra prediction according to some embodiments of the present disclosure.

FIG. 11 is a flowchart illustrating an exemplary process for intra prediction according to some embodiments of the present disclosure. In some embodiments, the process 1100 may be implemented as a set of instructions (e.g., an application) stored in the storage ROM 230 or RAM 240. The processor 220 and/or the modules in FIG. 12 may execute the set of instructions, and when executing the instructions, the processor 220 and/or the modules may be configured to perform the process 1100. The operations of the illustrated process presented below are intended to be illustrative. In some embodiments, the process 1100 may be accomplished with one or more additional operations not described and/or without one or more of the operations herein discussed. Additionally, the order in which the operations of the process as illustrated in FIG. 11 and described below is not intended to be limiting.

In 1101, reference lines may be defined in a left side and an upper side of a current coding block. In some embodiments, the reference lines may be defined by the processing device 112 (e.g., the preliminary predicted value determination module 1230 illustrated in FIG. 12) (e.g., the processing circuits of the processor 220). For convenience, it is assumed that for each of the four sides of the current coding block, there is only one reference line in the side.

In 1102, reference lines in a right side and a lower side of the current coding block may be constructed based on reference pixels in a lower left corner and an upper right corner of the current coding block. In some embodiments, the reference lines in the right side and the lower side of the current coding block may be constructed by the processing device 112 (e.g., the compensation predicted value determination module 1240 illustrated in FIG. 12) (e.g., the processing circuits of the processor 220).

In 1103, for each pixel in the current coding block, whether the pixel is a compensation pixel may be determined under an angle mode. In some embodiments, whether the pixel is the compensation pixel may be determined by the processing device 112 (e.g., a predetermined region determination module 1210 illustrated in FIG. 12) (e.g., the processing circuits of the processor 220). As described in connection with FIG. 4, the compensation pixel refers to a pixel within a compensation region in the current coding block, accordingly, pixels not within the compensation region in the current coding block may be referred to as non-compensation pixels.

In 1104, in response to determining that the pixel is the compensation pixel, a first predicted value and a second predicted value of the compensation pixel may be obtained under the angle mode. In some embodiments, the first predicted value and the second predicted value of the pixel may be obtained by the processing device 112 (e.g., the preliminary predicted value determination module 1230 or the compensation predicted value determination module 1240 illustrated in FIG. 12) (e.g., the processing circuits of the processor 220). As described in connection with FIG. 4, the first predicted value may be obtained based on a first projected predicted value corresponding to the compensation pixel on a reference line in the prediction direction of the angle mode; the second predicted value may be obtained based on a second projected predicted value corresponding to the compensation pixel on a reference lines in the direction opposite to the prediction direction of the angle mode.

In 1105, a first weighting coefficient of the first predicted value and a second weighting coefficient of the second predicted value may be calculated. In some embodiments, the first weighting coefficient and the second weighting coefficient may be determined by the processing device 112 (e.g., the preliminary predicted value determination module 1230 or the compensation predicted value determination module 1240 illustrated in FIG. 12) (e.g., the processing circuits of the processor 220).

In 1106, an angle mode predicted value of the compensation pixel may be calculated. In some embodiments, the angle mode predicted value of the compensation pixel may be determined by the processing device 112 (e.g., the target predicted value determination module 1250 illustrated in FIG. 12) (e.g., the processing circuits of the processor 220). In some embodiments, the angle mode predicted value of the compensation pixel may be determined according to formula (8) below:

$$P = \gamma 2 * P_C + \gamma 1 * P_T \qquad (8),$$

where P refers to the angle mode predicted value of the compensation pixel, $P_C$ refers to the second predicted value of the compensation pixel, $P_T$ refers to the first predicted value of the compensation pixel, γ2 refers to the second weighting coefficient, and γ1 refers to the first weighting coefficient.

In 1107, in response to determining that the pixel is not the compensation pixel, a first predicted value of the non-compensation pixel may be obtained under the angle mode as an angle mode predicted value of the non-compensation pixel. In some embodiments, the first predicted value of the non-compensation pixel may be obtained by the processing device 112 (e.g., the preliminary predicted value determination module 1230 or the target predicted value determination module 1250 illustrated in FIG. 12) (e.g., the processing circuits of the processor 220). Under the angle mode, operations 1103-1107 may be performed on each pixel in the current coding block and angle mode predicted values of pixels in the current coding block may be obtained.

In 1108, a predicted block corresponding to the current coding block may be generated under the angle mode based on the angle mode predicted values of the pixels in the current coding block. In some embodiments, the predicted block corresponding to the current coding block may be generated by the processing device 112 (e.g., the target predicted value determination module 1250 illustrated in FIG. 12) (e.g., the processing circuits of the processor 220). Further, at least one predicted block corresponding to the current coding block may be generated under at least one angle mode.

In 1109, for each of the at least one angle mode, an RD cost corresponding to the angle mode may be determined. In some embodiments, the RD cost corresponding to the angle mode may be determined by the processing device 112 (e.g., the target predicted value determination module 1250 illustrated in FIG. 12) (e.g., the processing circuits of the processor 220).

In 1110, a prediction mode with a minimum evaluation index (e.g., the RD cost) may be selected as the intra prediction mode of the current coding block by comparing the evaluation index(es) corresponding to the at least one angle mode. In some embodiments, the prediction mode with the minimum evaluation index may be selected by the processing device 112 (e.g., the target predicted value determination module 1250 illustrated in FIG. 12) (e.g., the processing circuits of the processor 220).

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 12:
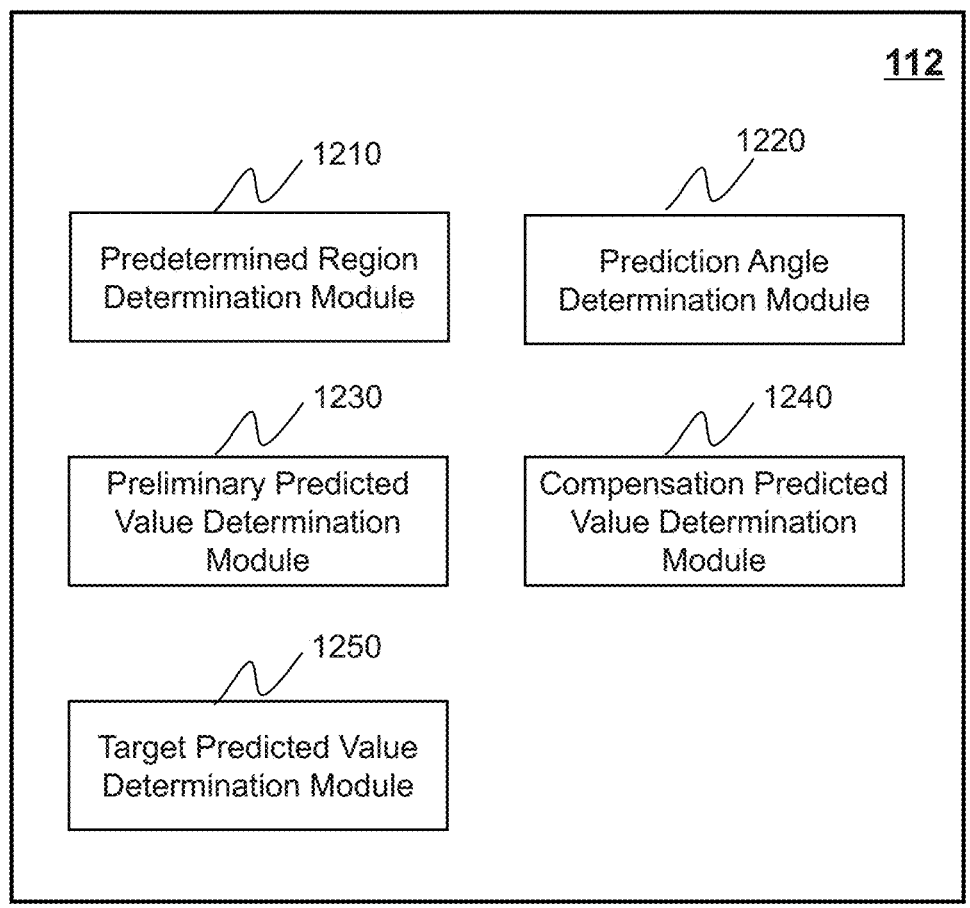
FIG. 12 is a block diagram illustrating an exemplary processing device according to some embodiments of the present disclosure.

FIG. 12 is a block diagram illustrating an exemplary processing device according to some embodiments of the present disclosure. The processing device 112 may include a predetermined region determination module 1210, a prediction angle determination module 1220, a preliminary predicted value determination module 1230, a compensation predicted value determination module 1240, and a target predicted value determination module 1250.

The predetermined region determination module 1210 may be configured to determine a predetermined region in a coding unit in an image (e.g., a still image or a video frame), the predetermined region including a plurality of pixels.

The prediction angle determination module 1220 may be configured to determine whether a prediction angle of a prediction mode (e.g., an angle prediction mode) is larger than or equal to 0° and smaller than or equal to 90°.

In response to determining that the prediction angle of the prediction mode is larger than or equal to 0° and smaller than or equal to 90°, for each of the plurality of pixels in the predetermined region, the preliminary predicted value determination module 1230 may be configured to determine a preliminary predicted value of the pixel based on at least one of one or more first reference lines associated with the coding unit along a prediction direction corresponding to the prediction angle. In some embodiments, the preliminary predicted value determination module 1230 may determine at least one target first reference line along a side (can be referred to as a "prediction side") which intersects the prediction direction of the prediction mode. For each of the at least one target first reference line, the preliminary predicted value determination module 1230 may determine an initial preliminary predicted value corresponding to the pixel based on at least one of the plurality of first reference pixels on the target first reference line. Further, the preliminary predicted value determination module 1230 may determine the preliminary predicted value of the pixel based on at least one initial preliminary projected value corresponding to the at least one target first reference line.

Further, the compensation predicted value determination module 1240 may be configured to determine a compensation predicted value of the pixel based on at least one of one or more second reference lines associated with the coding unit along a compensation direction opposite to the prediction direction. In some embodiments, the compensation predicted value determination module 1240 may determine at least one target second reference line along a target side of the coding unit based on the compensation direction. For each of the at least one target second reference line, the compensation predicted value determination module 1240 may determine an initial compensation predicted value corresponding to the pixel. Further, the compensation predicted value determination module 1240 may determine the compensation predicted value of the pixel based on at least one initial compensation projected value corresponding to the at least one target second reference line.

In response to determining that the prediction angle of the prediction mode is smaller than 0° or larger than 90°, for each of the plurality of pixels in the predetermined region, the preliminary predicted value determination module 1230 may be configured to determine the preliminary predicted value of the pixel based on at least one target first reference line along the prediction direction corresponding to the prediction angle. In some embodiments, for at least one of the at least one target first reference line, a count of first reference pixels on the target first reference line may be larger than a first predetermined threshold. In some embodiments, as described above, for each of the at least one target first reference line, the preliminary predicted value determination module 1230 may determine an initial preliminary predicted value corresponding to the pixel based on at least one of the plurality of first reference pixels on the target first reference line and determine the preliminary predicted value of the pixel based on at least one initial preliminary projected value corresponding to the at least one target first reference line.

Further, the compensation predicted value determination module 1240 may be configured to determine the compensation predicted value of the pixel based on at least one candidate first reference line along the compensation direction opposite to the prediction direction. In some embodiments, similarly, for each of the at least one candidate first reference line, the compensation predicted value determination module 1240 may determine an initial compensation predicted value corresponding to the pixel based on at least one of the plurality of first reference pixels on the candidate first reference line and determine the compensation predicted value of the pixel based on at least one initial compensation projected value corresponding to the at least one candidate first reference line.

The target predicted value determination module 1250 may be configured to determine a target predicted value of the pixel based on the preliminary predicted value and the compensation predicted value. In some embodiments, the target predicted value determination module 1250 may determine a first weighting coefficient corresponding to the preliminary predicted value of the pixel and a second weighting coefficient corresponding to the compensation predicted value of the pixel. Further, target predicted value determination module 1250 may determine the target predicted value of the pixel by weighting the preliminary predicted value and the compensation predicted value based on the first weighting coefficient and the second weighting coefficient. In some embodiments, the second weighting coefficient may be associated with a first global distance between the pixel and a first global projection location corresponding to the preliminary predicted value and a second global distance between the pixel and a second global projection location corresponding to the compensation predicted value; the first weighting coefficient may be determined based on the second weighting coefficient.

The modules in the processing device 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units.

For example, the preliminary predicted value determination module 1230 and the compensation predicted value determination module 1240 may be combined as a single module which may both determine the preliminary predicted value and the compensation predicted value of each pixel in the predetermined region. As another example, the processing device 112 may also include a transmission module configured to transmit signals (e.g., electrical signals, electromagnetic signals) to one or more components (e.g., the acquisition device 130, the user device 140, the storage device 150) of the image coding system 100. As a further example, the processing device 112 may include a storage module (not shown) used to store information and/or data (e.g., the predetermined region, the prediction mode, the prediction angle of the prediction mode) associated with the image coding.

Figure 13:
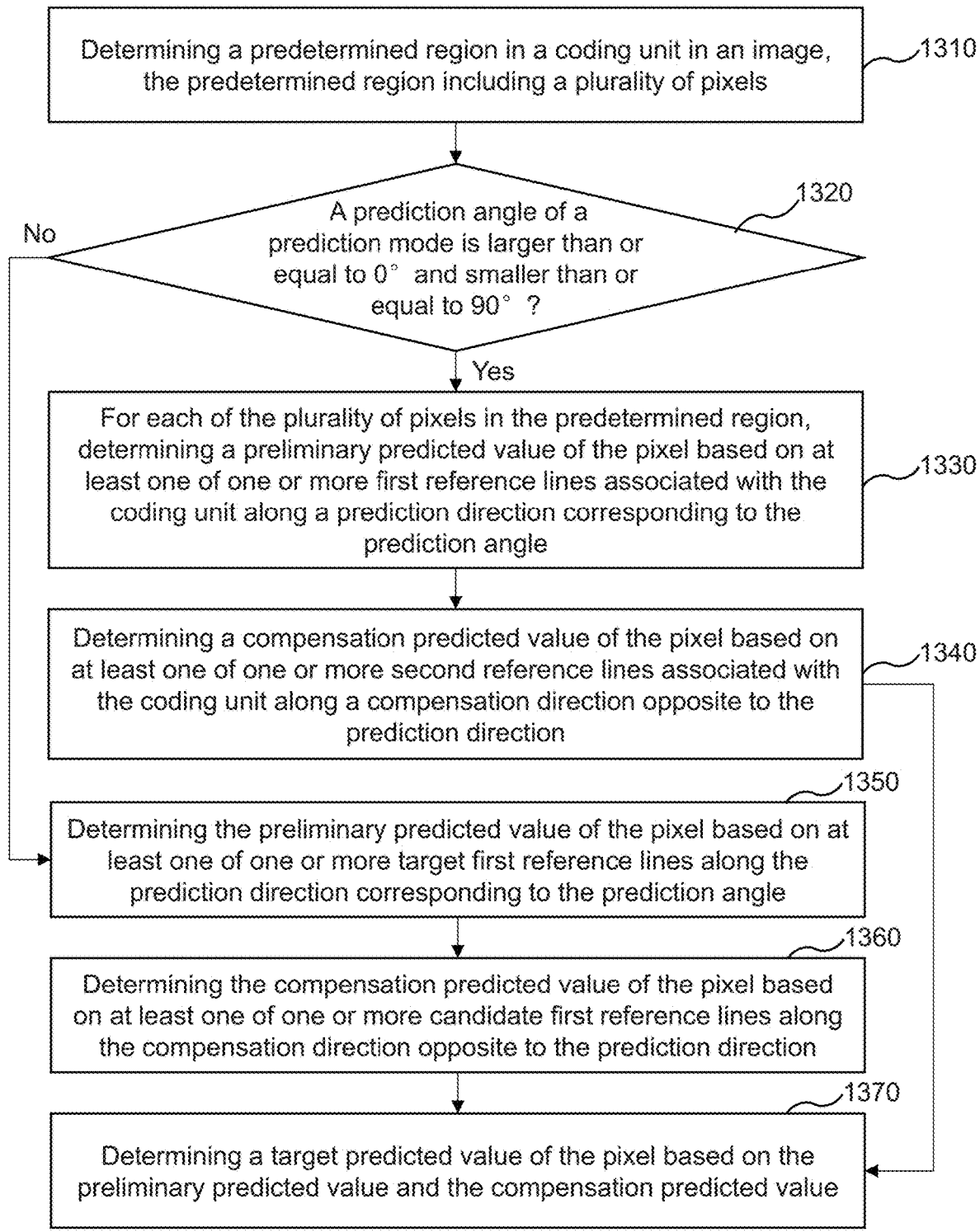
FIG. 13 is a flowchart illustrating an exemplary process for image coding according to some embodiments of the present disclosure.

FIG. 13 is a flowchart illustrating an exemplary process for image coding according to some embodiments of the present disclosure. In some embodiments, the process 1300 may be implemented as a set of instructions (e.g., an application) stored in the storage ROM 230 or RAM 240. The processor 220 and/or the modules in FIG. 12 may execute the set of instructions, and when executing the instructions, the processor 220 and/or the modules may be configured to perform the process 1300. The operations of the illustrated process presented below are intended to be illustrative. In some embodiments, the process 1300 may be accomplished with one or more additional operations not described and/or without one or more of the operations herein discussed. Additionally, the order in which the operations of the process as illustrated in FIG. 13 and described below is not intended to be limiting.

In 1310, the processing device 112 (e.g., the predetermined region determination module 1210) (e.g., the processing circuits of the processor 220) may determine a predetermined region in a coding unit in an image (e.g., a still image or a video frame), the predetermined region including a plurality of pixels. The processing device 112 may obtain the image from the acquisition device 130 or the storage device 150 via the network 120.

As described in connection with operation 410, the coding unit refers to a unit to be encoded in the image. In some embodiments, the coding unit may be a quadrilateral region (e.g., a square) with a predetermined size in the image. The predetermined size may be a default setting of the image coding system 100 or may be adjustable under different situations. For example, the predetermined size may be 2 pixels*2 pixels, 4 pixels*4 pixels, 8 pixels*8 pixels, 16 pixels*16 pixels, 32 pixels*32 pixels, 64 pixels*64 pixels, 128 pixels*128 pixels, etc. Further, the predetermined region may be a quadrilateral region (e.g., a rectangle) with a predetermined size in the coding unit. The predetermined size may be associated with an active boundary of the predetermined region. As described in connection with FIGS. 7A-9B, the active boundary may be parallel to a target side of the coding unit and may be larger than a centerline (e.g., 710, 720, 810, 820, 910, 920) between the target side and a side of the coding unit parallel to the target side and less than the side parallel to the target side.

In 1320, the processing device 112 (e.g., the prediction angle determination module 1220) (e.g., the processing circuits of the processor 220) may determine whether a prediction angle of a prediction mode (e.g., an angle prediction mode) is larger than or equal to 0° and smaller than or equal to 90°. That is, as described in connection with operation 420, the processing device 112 may determine whether the prediction mode is a negative angle mode or a zero angle mode.

In 1330, in response to determining that the prediction angle of the prediction mode is larger than or equal to 0° and smaller than or equal to 90° (i.e., the prediction mode is a negative angle mode or a zero angle mode), for each of the plurality of pixels in the predetermined region, the processing device 112 (e.g., the preliminary predicted value determination module 1230) (e.g., the processing circuits of the processor 220) may determine a preliminary predicted value of the pixel based on at least one of one or more first reference lines associated with the coding unit along a prediction direction corresponding to the prediction angle.

In some embodiments, the one or more first reference lines may be along a first side (e.g., a left side) or a second side (e.g., an upper side) of the coding unit. As used herein, a side of a coding unit may refer to a region beside a boundary of the coding unit. For example, the first side of the coding unit may refer to a first region beside a first boundary (e.g., a left boundary) of the coding unit and the second side of the coding unit may refer to a second region beside a second boundary (e.g., an upper boundary) of the coding unit. Each of the one or more first reference lines may be parallel to the first boundary or the second boundary of the coding unit. In some embodiments, as described in connection with operation 410, each of the one or more first reference lines includes a plurality of first reference pixels and each of the plurality of first reference pixels corresponds to a first reference pixel value which may be determined based on pixel value(s) of pixel(s) that have been encoded.

In some embodiments, the processing device 112 may determine at least one target first reference line along a side (can be referred to as a "prediction side") which intersects the prediction direction of the prediction mode. For each of the at least one target first reference line, the processing device 112 may determine an initial preliminary predicted value corresponding to the pixel based on at least one of the plurality of first reference pixels on the target first reference line. For example, the processing device 112 may determine a projected pixel corresponding to the pixel on the target first reference line along the prediction direction and determine a pixel value of the projected pixel as the initial preliminary predicted value corresponding to the pixel. As another example, the processing device 112 may determine two first reference pixels adjacent to a first projection location of the pixel on the target first reference line along the prediction direction and determine the initial preliminary predicted value corresponding to the pixel by performing an interpolation on the two first reference pixels. Further, the processing device 112 may determine the preliminary predicted value of the pixel based on at least one initial preliminary projected value corresponding to the at least one target first reference line. For example, the processing device 112 may determine an average value of the at least one initial preliminary projected value corresponding to the at least one target first reference line as the preliminary predicted value of the pixel. As another example, for each of the at least one initial preliminary projected value corresponding to the at least one target first reference line, the processing device 112 may determine a weighting coefficient corresponding to the initial preliminary predicted value based on a distance between the pixel and a target first reference line corresponding to the initial preliminary predicted value. Further, the processing device 112 may determine the preliminary predicted value of the pixel by weighting the at least one initial preliminary projected value based on at least one weighting coefficient corresponding to the at least one initial preliminary projected value.

In 1340, the processing device 112 (e.g., the compensation predicted value determination module 1240) (e.g., the processing circuits of the processor 220) may determine a compensation predicted value of the pixel based on at least one of one or more second reference lines associated with the coding unit along a compensation direction opposite to the prediction direction.

In some embodiments, the one or more second reference lines may be along a third side (e.g., a right side) or a fourth side (e.g., a lower side) of the coding unit. As described above, each of the one or more second reference lines may be parallel to a third boundary or a fourth boundary of the coding unit. In some embodiments, as described in connection with operation 410 and FIG. 5, each of the one or more second reference lines includes a plurality of second reference pixels and each of the plurality of second reference pixels corresponds to a second reference pixel value which may be determined based on the first reference pixel values corresponding to the first reference pixels on the first reference lines. More descriptions regarding determining the one or more second reference lines may be found elsewhere in the present disclosure (e.g., FIG. 5, FIG. 14, and the descriptions thereof).

In some embodiments, the processing device 112 may determine at least one target second reference line along a target side of the coding unit based on the compensation direction. As used herein, as illustrated in FIG. 9A and FIG. 9B, for a prediction mode (i.e., the negative angle mode) with a prediction angle larger than 0° and less than 90°, the target side refers to a side adjacent to the prediction side and along the compensation direction. For example, if the prediction side is the left side, the target side is the lower side; if the prediction side is the upper side, the target side is the right side. As illustrated in FIG. 8A and FIG. 8B, for a prediction mode (i.e., the zero angle mode) with a prediction angle equal to 0° or 90°, the target side refers to a side parallel to the prediction side. For example, if the prediction side is the left side, the target side is the right side; if the prediction side is the upper side, the target side is the lower side. For each of the at least one target second reference line, the processing device 112 may determine an initial compensation predicted value corresponding to the pixel. Further, the processing device 112 may determine the compensation predicted value of the pixel based on at least one initial compensation projected value corresponding to the at least one target second reference line. For example, the processing device 112 may determine an average value of the at least one initial compensation projected value corresponding to the at least one target second reference line as the compensation predicted value of the pixel. As another example, for each of the at least one initial compensation projected value corresponding to the at least one target second reference line, the processing device 112 may determine a weighting coefficient corresponding to the initial compensation predicted value based on a distance between the pixel and a target second reference line corresponding to the initial compensation predicted value. Further, the processing device 112 may determine the compensation predicted value of the pixel by weighting the at least one initial compensation projected value based on at least one weighting coefficient corresponding to the at least one initial compensation projected value. More descriptions regarding determining the compensation predicted value of the pixel may be found elsewhere in the present disclosure (e.g., FIG. 15 and the descriptions thereof).

In 1350, in response to determining that the prediction angle of the prediction mode is smaller than 0° or larger than 90°, for each of the plurality of pixels in the predetermined region, the processing device 112 (e.g., the preliminary predicted value determination module 1230) (e.g., the processing circuits of the processor 220) may determine the preliminary predicted value of the pixel based on at least one target first reference line along the prediction direction corresponding to the prediction angle.

In some embodiments, for an angle mode with a prediction angle smaller than 0°, the at least one target first reference line may be along the left side of the coding unit; for an angle mode with a prediction angle larger than 90°, the at least one target first reference line may be along the upper side of the coding unit.

In some embodiments, for at least one of the at least one target first reference line, a count of first reference pixels on the target first reference line may be larger than a first predetermined threshold. The first predetermined threshold may be a default setting of the image coding system 100 or adjustable under different situations. For example, the first predetermined threshold may be set as a value which can ensure that for each of the plurality of pixels in the predetermined region, a first projection location along the prediction direction corresponding to the prediction angle smaller than 0° or larger than 90° can be determined on the target first reference line. As another example, for an angle mode with a prediction angle smaller than 0°, the at least one target first reference line may be along the left side of the coding unit, accordingly, for at least one of the at least one target first reference line, a count of first reference pixels on the target first reference line may be set as $Z_1$*height and $Z_1$ may be an positive integer larger than 2. As a further example, for an angle mode with a prediction angle larger than 90°, the at least one target first reference line may be along the upper side of the coding unit, accordingly, for at least one of the at least one target first reference line, a count of first reference pixels on the target first reference line may be set as $Z_2$*width and $Z_2$ may be an positive integer larger than 2. Additionally or alternatively, for at least one of the at least one target first reference line, if the count of the first reference pixels on the target first reference line is equal to 2*height or 2*width and a first projection location of the pixel is located on an extension line of the target first reference line, the processing device 112 may determine the preliminary predicted value of the pixel based on at least one first reference pixel closest to the first projection location of the pixel on the target first reference line.

In some embodiments, as described in connection with operation 1330, for each of the at least one target first reference line, the processing device 112 may determine an initial preliminary predicted value corresponding to the pixel based on at least one of the plurality of first reference pixels on the target first reference line (e.g., based on a projected pixel or an interpolation result of two first reference pixels) and determine the preliminary predicted value (e.g., a weighted average value of the at least one initial preliminary projected value) of the pixel based on at least one initial preliminary projected value corresponding to the at least one target first reference line.

In 1360, the processing device 112 (e.g., the compensation predicted value determination module 1240) (e.g., the processing circuits of the processor 220) may determine the compensation predicted value of the pixel based on at least one candidate first reference line along the compensation direction opposite to the prediction direction.

In some embodiments, for an angle mode with a prediction angle smaller than 0°, the at least one candidate first reference line may be along the upper side of the coding unit; for an angle mode with a prediction angle larger than 90°, the at least one candidate first reference line may be along the left side of the coding unit.

In some embodiments, for at least one of the at least one candidate first reference line, a count of first reference pixels on the candidate first reference line may be larger than a second predetermined threshold. The second predetermined threshold may be a default setting of the image coding system 100 or adjustable under different situations. As described above, the second predetermined threshold may be set as a value (e.g., $Z_1$*height or $Z_2$*width) which can ensure that for each of the plurality of pixels in the predetermined region, a second projection location along the compensation direction opposite to the prediction direction can be determined on the candidate first reference line. Additionally or alternatively, for at least one of the at least one candidate first reference line, if the count of the first reference pixels on the candidate first reference line is equal to 2*height or 2* width and a second projection location of the pixel is located on an extension line of the candidate first reference line, the processing device 112 may determine the compensation predicted value of the pixel based on at least one first reference pixel closest to the second projection location of the pixel on the candidate first reference line.

In some embodiments, similarly, for each of the at least one candidate first reference line, the processing device 112 may determine an initial compensation predicted value corresponding to the pixel based on (e.g., based on a projected pixel or an interpolation result of two first reference pixels) at least one of the plurality of first reference pixels on the candidate first reference line and determine the compensation predicted value (e.g., a weighted average value of the at least one initial preliminary projected value) of the pixel based on at least one initial compensation projected value corresponding to the at least one candidate first reference line.

In 1370, the processing device 112 (e.g., the target predicted value determination module 1250) (e.g., the processing circuits of the processor 220) may determine a target predicted value of the pixel based on the preliminary predicted value and the compensation predicted value.

In some embodiments, the processing device 112 may determine a first weighting coefficient corresponding to the preliminary predicted value of the pixel and a second weighting coefficient corresponding to the compensation predicted value of the pixel. Further, the processing device 112 may determine the target predicted value of the pixel by weighting the preliminary predicted value and the compensation predicted value based on the first weighting coefficient and the second weighting coefficient. For example, the processing device 112 may determine the target predicted value of the pixel according to formula (8).

In some embodiments, the second weighting coefficient may be associated with a first global distance between the pixel and a first global projection location corresponding to the preliminary predicted value and a second global distance between the pixel and a second global projection location corresponding to the compensation predicted value; the first weighting coefficient may be determined based on the second weighting coefficient. In some embodiments, the first global distance may be a first distance (e.g., an actual distance (e.g., d1 illustrated in FIG. 7A, FIG. 8A, or FIG. 9A), a horizontal distance, a vertical distance) between the pixel and a first projection location of the pixel on a target first reference line closest to the coding unit or an average distance (e.g., an average actual distance, an average horizontal distance, an average vertical distance) between the pixel and at least one first projection location of the pixel on the at least one target first reference line; the second global distance may be a distance (e.g., an actual distance (e.g., d2 illustrated in FIG. 7A, FIG. 8A, FIG. 9A), a horizontal distance, a vertical distance) between the pixel and a second projection location of the pixel on a target second reference line (if the prediction angle is larger than or equal to 0° and smaller than or equal to 90°) or a candidate first reference line (if the prediction angle is smaller than or equal to 0° or larger than 90°) closest to the coding unit or an average distance (e.g., an average actual distance, an average horizontal distance, an average vertical distance) between the pixel and at least one second projection location of the pixel on the at least one target second reference line or the at least one candidate first reference line. Merely by way of example, the processing device 112 may determine the first weighting coefficient and the second weighting coefficient according to formula (1), formula (5), formula (6), or formula (7).

In some embodiments, as described in connection with FIG. 11, the processing device 112 may determine the target predicted value of the pixel according to formula (8). In the above embodiments, the processing device 112 determines the first weighting coefficient based on the first global distance and the second global distance, which improves the accuracy of the determined first weighting coefficient and further improves the accuracy of the target predicted value of the pixel, thereby improving the effect of reducing the data redundancy of the coding unit.

In some embodiments, for each of the plurality of pixels not in the predetermined region, the processing device 112 may determine the preliminary predicted value of the pixel as the target predicted value of the pixel. According to a plurality of target predicted values of the plurality of compensation pixels and non-compensation pixels in the coding unit, the processing device 112 may determine a predicted coding unit corresponding to the coding unit. In some embodiments, the processing device 112 may determine a plurality of predicted coding units corresponding to the coding unit based on a plurality of prediction modes (e.g., multiple angle modes with different angles, the DC prediction mode, and the planar prediction mode). Each of the plurality of predicted coding units may correspond to a respective one of the plurality of prediction modes. For each of the plurality of predicted coding units (i.e., for each of the plurality prediction modes), the processing device 112 may determine an RD cost corresponding to the prediction mode by performing a rate-distortion optimization (RDO) on the predicted coding unit. Further, the processing device 112 may select an optimal prediction mode with a minimum RD cost from the plurality of prediction modes. Accordingly, a predicted coding unit determined under the optimal prediction mode may be regarded as an optimal predicted coding unit.

Further, the processing device 112 may generate a coded image corresponding to the image based on optimal predicted coding units corresponding to a plurality of coding units in the image and transmit the coded image to one or more components (e.g., the user device 140, the storage device 150) of the image coding system 100 to be further processed. For example, after receiving the coded image, the user device 140 may decode the coded image and display the decoded image.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in the process 1300. In the storing operation, the processing device 112 may store information and/or data (e.g., the predetermined region, the prediction mode, the prediction angle of the prediction mode) associated with the image coding in a storage device (e.g., the storage device 150) disclosed elsewhere in the present disclosure. As another example, the processing device 112 may determine whether a filtering operation (e.g., a smoothing filtering operation) needs to be performed on reference pixels on at least a portion of the reference lines based on a size of the coding unit and/or a type of the prediction mode. When the size of the coding unit is larger than a size threshold and/or the type of the prediction mode is not a DC mode, the processing device 112 may determine that a filtering operation needs to be performed.

Figure 14:
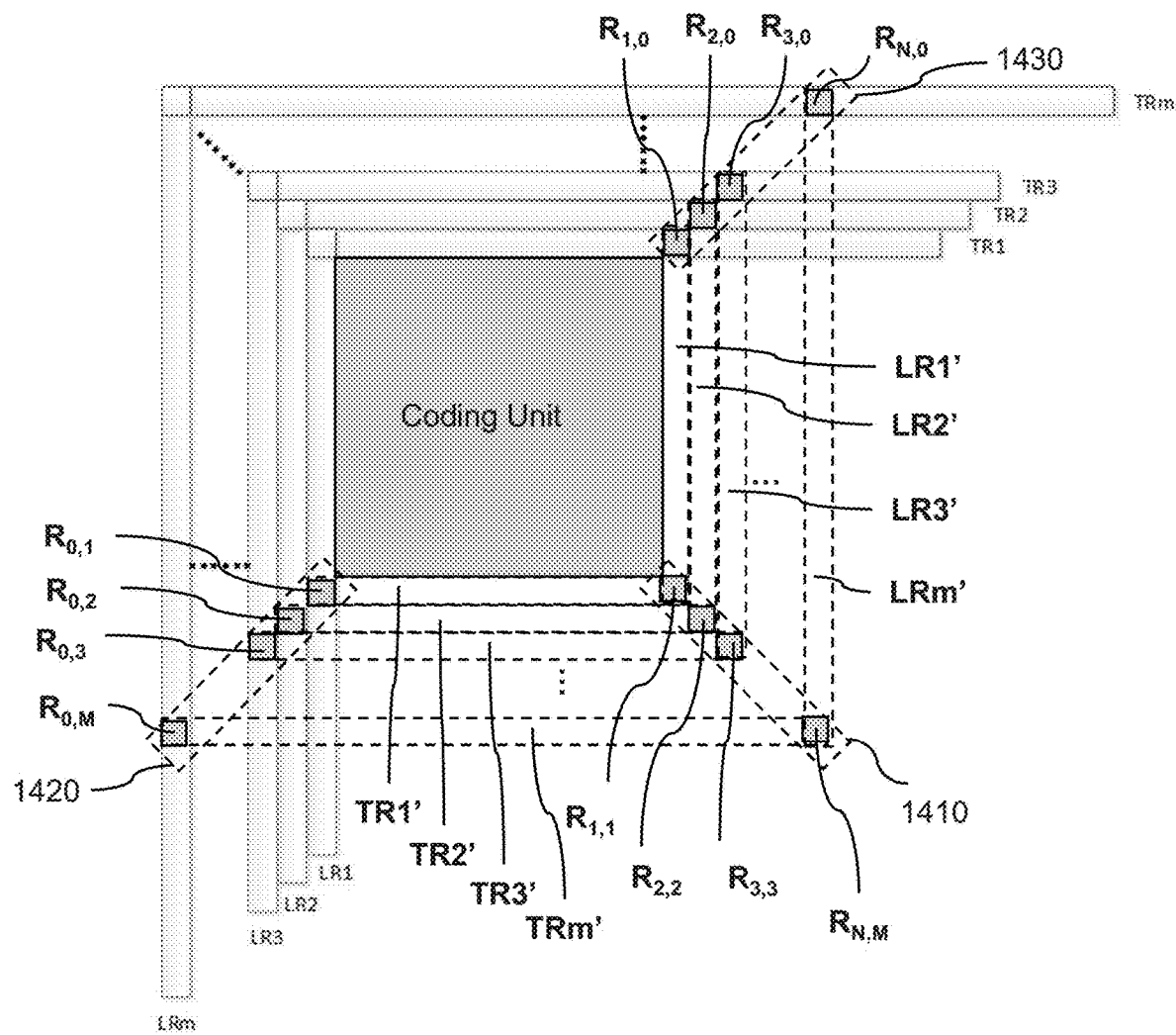
FIG. 14 is a schematic diagram illustrating exemplary operations for determining one or more second reference lines along a third side or a fourth side of a coding unit according to some embodiments of the present disclosure.

FIG. 14 is a schematic diagram illustrating exemplary operations for determining one or more second reference lines along a third side or a fourth side of a coding unit according to some embodiments of the present disclosure. As illustrated in FIG. 14, it is assumed that a count of the reference lines in each side of the coding unit is larger than 1, the first side is a left side of the coding unit, the second side is an upper side of the coding unit, the third side is the right side of the coding unit, and the fourth side may be the lower side of the coding unit.

As illustrated, the processing device 112 may determine an intersection second reference pixel (e.g., $R_{1,1}, R_{2,2}, R_{3,3}, \ldots, R_{N,M}$) located at an intersection area (e.g., 1410) of the third side and the fourth side of the coding unit based on one or more first reference pixels (e.g., $R_{0,1}, R_{0,2}, R_{0,3}, \ldots, R_{0,M}$) located at an intersection area (e.g., 1420) of the first side and the fourth side, one or more first reference pixels (e.g., $R_{1,0}, R_{2,0} R_{3,0}, \ldots, R_{N,0}$) located at an intersection area (e.g., 1430) of the second side and the third side, a height of the coding unit, and a width of the coding unit. For example, the processing device 112 may determine a reference pixel value corresponding to the intersection second reference pixel according to formula (2).

Further, the processing device 112 may determine a plurality of second reference lines (e.g., LR1', LR2', LR3', ..., LRm') along the third side, each of which includes the intersection second reference pixel (e.g., $R_{1,1}, R_{2,2}, R_{3,3}, \ldots, R_{N,M}$) and remainder second reference pixels, wherein the remainder second reference pixels may be determined based on the intersection second reference pixel, the one or more first reference pixels (e.g., $R_{1,0}, R_{2,0} R_{3,0}, \ldots, R_{N,0}$) located at the intersection area (e.g., 1430) of the second side and the third side, and the height of the coding unit. For example, the processing device 112 may determine reference pixel values corresponding to the remainder second reference pixels in the second reference line along the third side according to formula (3).

The processing device 112 may also determine a plurality of second reference lines (e.g., TR1', TR2', TR3', ..., TRm') along the fourth side, each of which includes the intersection second reference pixel (e.g., $R_{1,1}, R_{2,2}, R_{3,3}, \ldots, R_{N,M}$) and remainder second reference pixels, wherein the remainder second reference pixels may be determined based on the intersection second reference pixel, the one or more first reference pixels (e.g., $R_{0,1}, R_{0,2}, R_{0,3}, \ldots, R_{0,M}$) located at the intersection area (e.g., 1420) of the first side and the fourth side, and the width of the coding unit. For example, the processing device 112 may determine pixel values of the remainder second reference pixels in the second reference line along the fourth side according to formula (4).

Figure 15:
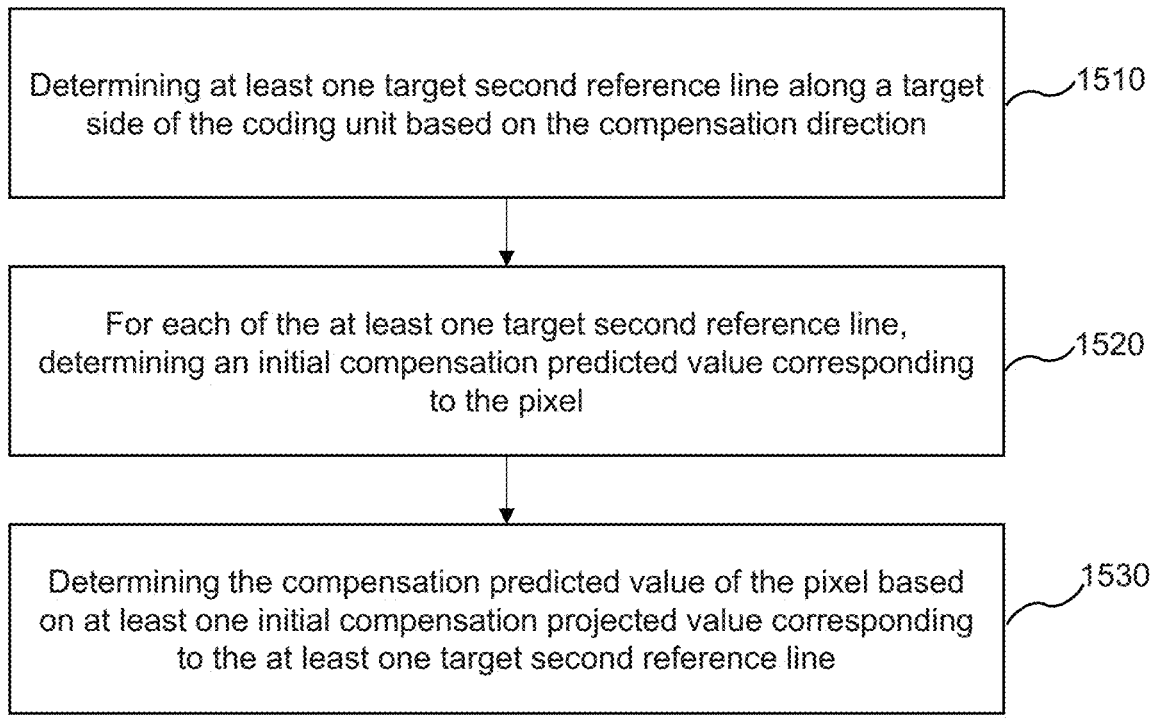
FIG. 15 is a flowchart illustrating an exemplary process for determining a compensation predicted value of a pixel in a predetermined region according to some embodiments of the present disclosure.

FIG. 15 is a flowchart illustrating an exemplary process for determining a compensation predicted value of a pixel in a predetermined region according to some embodiments of the present disclosure. In some embodiments, the process 1500 may be implemented as a set of instructions (e.g., an application) stored in the storage ROM 230 or RAM 240. The processor 220 and/or the modules in FIG. 12 may execute the set of instructions, and when executing the instructions, the processor 220 and/or the modules may be configured to perform the process 1500. The operations of the illustrated process presented below are intended to be illustrative. In some embodiments, the process 1500 may be accomplished with one or more additional operations not described and/or without one or more of the operations herein discussed. Additionally, the order in which the operations of the process as illustrated in FIG. 15 and described below is not intended to be limiting.

In 1510, the processing device 112 (e.g., the compensation predicted value determination module 1240) (e.g., the processing circuits of the processor 220) may determine at least one target second reference line along a target side of the coding unit based on the compensation direction. As described in connection with FIG. 7A and operation 1340, for a prediction mode (i.e., the negative angle mode) with a prediction angle larger than 0° and less than 90°, the target side refers to a side adjacent to the prediction side and along the compensation direction; for a prediction mode (i.e., the zero angle mode) with a prediction angle equal to 0° or 90°, the target side refers to a side parallel to the prediction side.

In 1520, for each of the at least one target second reference line, the processing device 112 (e.g., the compensation predicted value determination module 1240) (e.g., the processing circuits of the processor 220) may determine an initial compensation predicted value corresponding to the pixel.

In some embodiments, the processing device 112 may determine whether the compensation direction intersects the target side. In response to determining that the compensation direction intersects the target side, for each of the at least one target second reference line, the processing device 112 may determine the initial compensation predicted value corresponding to the pixel based on at least one of the plurality of second reference pixels on the target second reference line. For example, the processing device 112 may determine a projected pixel corresponding to the pixel on the target second reference line along the compensation direction and determine the initial compensation predicted value corresponding to the pixel based on the projected pixel. As another example, as described in connection with FIG. 9B, the processing device 112 may determine two second reference pixels (e.g., b3 and b4) corresponding to the pixel on the target second reference line (e.g., FR) along the compensation direction (e.g., B) and determine the initial compensation predicted value corresponding to the pixel by performing an interpolation on the two second reference pixels.

In response to determining that the compensation direction does not intersect the target side, the processing device 112 may determine at least one candidate second reference line along a candidate side of the coding unit, wherein the compensation direction intersects the candidate side and each of the at least one candidate second reference line corresponds to a respective one of the at least one target second reference line. As described in connection with FIG. 9A, when the prediction angle of the prediction mode is larger than 0° and smaller than 90° and the prediction direction intersects the second side, the target side is the third side and the candidate side is the fourth side. For each of the at least one candidate second reference line, the processing device 112 may determine at least one candidate compensation pixel corresponding to the pixel on the candidate second reference line along the compensation direction. For example, the processing device 112 may determine a projected pixel corresponding to the pixel on the candidate second reference line along the compensation direction as a candidate compensation pixel corresponding to the pixel. As another example, the processing device 112 may determine two second reference pixels (e.g., b1 and b2 illustrated in FIG. 9A) corresponding to the pixel on the candidate second reference line (e.g., FR illustrated in FIG. 9A) along the compensation direction as two candidate compensation pixels corresponding to the pixel.

Further, for each of the at least one target second reference line, the processing device 112 may determine the initial compensation predicted value corresponding to the pixel based on by mapping the corresponding at least one candidate compensation pixel onto an extension line of the target second reference line. For example, the processing device 112 may map the candidate compensation pixel corresponding to the projected pixel onto the extension line of the target second reference line (e.g., RR illustrated in FIG. 9A) and designate a reference pixel value of the candidate compensation pixel as the initial compensation predicted value corresponding to the pixel. As another example, the processing device 112 may map the two candidate compensation pixels corresponding to two second reference pixels (e.g., b1 and b2 illustrated in FIG. 9A) onto the extension line of the target second reference line (e.g., RR illustrated in FIG. 9A) and determine an interpolation result of the two candidate compensation pixels as the initial compensation predicted value corresponding to the pixel.

In 1530, the processing device 112 (e.g., the compensation predicted value determination module 1240) (e.g., the processing circuits of the processor 220) may determine the compensation predicted value of the pixel based on at least one initial compensation projected value corresponding to the at least one target second reference line.

As described in connection with FIG. 13, for each of the at least one initial compensation projected value corresponding to the at least one target second reference line, the processing device 112 may determine a weighting coefficient corresponding to the initial compensation predicted value based on a distance between the pixel and a target second reference line corresponding to the initial compensation predicted value. Further, the processing device 112 may determine the compensation predicted value of the pixel by weighting the at least one initial compensation projected value based on at least one weighting coefficient corresponding to the at least one initial compensation projected value.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 16:
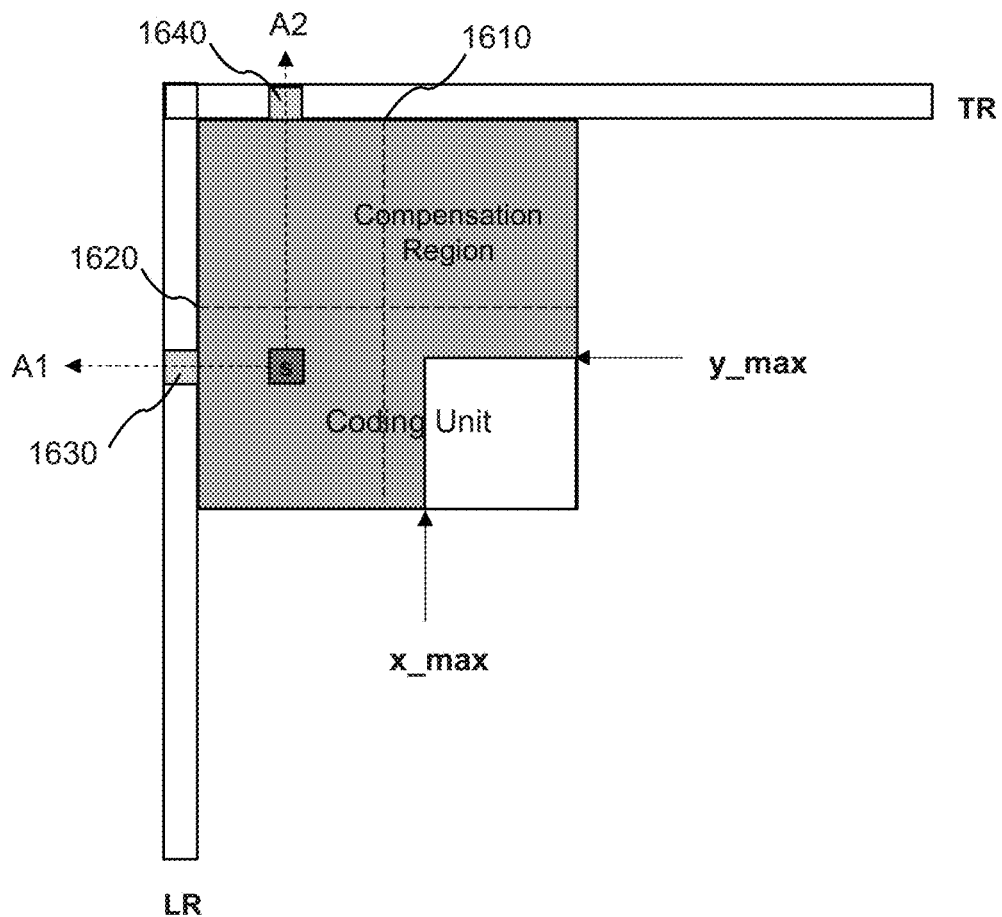
FIG. 16 is a schematic diagram illustrating exemplary operations for determining a target predicted value of a pixel under a DC prediction mode according to some embodiments of the present disclosure.

FIG. 16 is a schematic diagram illustrating exemplary operations for determining a target predicted value of a pixel under a DC prediction mode according to some embodiments of the present disclosure. As illustrated in FIG. 16, it is still assumed that a count of the reference lines in each side of the coding unit is 1, the first side is the left side of the coding unit, and the second side is the upper side of the coding unit.

Under the DC mode, the compensation region may include an active boundary (e.g., x_max) parallel to the first side of the coding unit and an active boundary (e.g., y_max) parallel to the second side of the coding unit. x_max may be larger than a centerline (e.g., 1610) of the coding unit and less than a side of the coding unit parallel to the first side. y_max may be larger than a centerline (e.g., 1620) of the coding unit and less than a side of the coding unit parallel to the second side.

As illustrated in FIG. 16, take a specific pixels in a coding unit as an example, the processing device 112 may determine a first projected pixel 1630 corresponding to the pixel s on a first reference line LR along a horizontal direction denoted by arrow A1. The processing device 112 may determine a second projected pixel 1640 corresponding to the pixel s on a first reference line TR along a vertical direction denoted by arrow A2. Further, the processing device 112 may determine an average of pixel values of the first projected pixel 1630 and the second projected pixel 1640 as a preliminary predicted value of the pixel s.

In some embodiments, the processing device 112 may determine weighting coefficients corresponding to the first projected pixel 1630, the second projected pixel 1640, and the preliminary predicted value of the pixel s. For example, the processing device 112 may determine the weighting coefficients according to formula (9) below:

$$\begin{cases} wT = Y1 \le y_{max}\,?\alpha 3*\left(\dfrac{\text{height}-Y^1}{\text{height}}\right):0 \\ wL = X1 \le x_{max}\,?\alpha 4*\left(\dfrac{\text{width}-X^1}{\text{width}}\right):0 \\ \gamma = 1 - wL - wT \end{cases} \quad (9)$$

where wT refers to a weighting coefficient corresponding to the second projected pixel 1640, wL refers to a weighting coefficient corresponding to the first projected pixel 1630, γ refers to a weighting coefficient of the preliminary predicted value, α3 refers to a weight influence factor of the second projected pixel 1640 and a value range of α3 is [0, 0.5], α4 refers to a weight influence factor of the first projected pixel 1630 and a value range of α4 is [0, 0.5], X1 refers to a horizontal distance between the pixel s and the first reference line LR, and Y1 refers to a vertical distance between the pixel s and the first reference line TR.

In some embodiments, the processing device 112 may determine a target predicted value of the pixel s by weighting the pixel value of the first projected pixel 1630, the pixel value of the second projected pixel 1640, the pixel value of the intersection pixel 1650, and the preliminary predicted value of the pixel s. For example, the processing device 112 may determine the target predicted value of the pixel s according to formula (10) below:

$$P_{x,y} = (wL*L_{O,y} + wT*T_{x,0} + \gamma*P'_{x,y}) \quad (10),$$

where $P_{x,y}$ refers to the target predicted value of the pixel s, $L_{O,y}$ refers to the pixel value of the first projected pixel 1630, $T_{x,0}$ refers to the pixel value of the second projected pixel 1640, and $P'_{x,y}$ refers to the preliminary predicted value of the pixel s.

Figure 17:
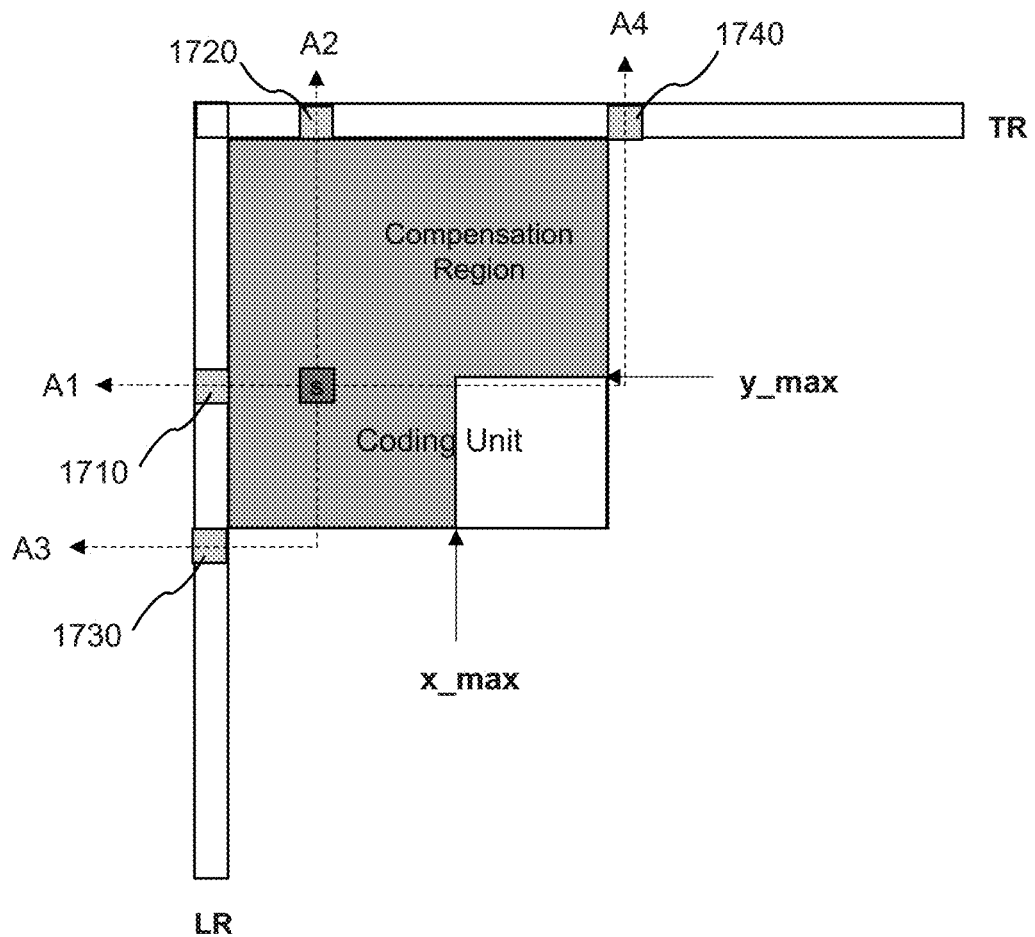
FIG. 17 is a schematic diagram illustrating exemplary operations for determining a target predicted value of a pixel under a planar prediction mode according to some embodiments of the present disclosure.

FIG. 17 is a schematic diagram illustrating exemplary operations for determining a target predicted value of a pixel under a planar prediction mode according to some embodiments of the present disclosure. As illustrated in FIG. 17, it is still assumed that a count of the reference lines in each side of the coding unit is 1, the first side is the left side of the coding unit, and the second side is the upper side of the coding unit.

Under the planar mode, as described in connection with FIG. 16, the compensation region may also include the active boundary (e.g., x_max) parallel to the first side of the coding unit and the active boundary (e.g., y_max) parallel to the second side of the coding unit.

As described in connection with FIG. 16, still take the specific pixel s in the coding unit as an example, the processing device 112 may determine a first projected pixel 1710 corresponding to the pixel s on the first reference line LR along the horizontal direction denoted by the arrow A1 and a second projected pixel 1720 corresponding to the pixel s on the first reference line TR along the vertical direction denoted by the arrow A2. As illustrated in FIG. 17, the processing device 112 may further determine a first candidate projected pixel 1730 corresponding to the pixel s on the first reference line LR along a direction denoted by arrow A3 and a second candidate projected pixel 1740 corresponding to the pixel s on the first reference line TR along a direction denoted by arrow A4. Further, the processing device 112 may determine an average of pixel values of the first projected pixel 1710, the first candidate projected pixel 1730, the second projected pixel 1720, and the second candidate projected pixel 1740 as a preliminary predicted value of the pixel s.

In some embodiments, the processing device 112 may determine weighting coefficients corresponding to the first projected pixel 1710, the second projected pixel 1720, and the preliminary predicted value of the pixel s. For example, the processing device 112 may determine the weighting coefficients according to formula (11) below:

$$\begin{cases} wT = Y1 \le y_{max}\,?\alpha 3*\left(\dfrac{\text{height}-Y^1}{\text{height}}\right): \\ wL = X1 \le x_{max}\,?\alpha 4*\left(\dfrac{\text{width}-X^1}{\text{width}}\right):0 \\ \gamma = 1 - wL - wT \end{cases} \quad (11)$$

where wT refers to a weighting coefficient corresponding to the second projected pixel 1720, wL refers to a weighting coefficient corresponding to the first projected pixel 1710, γ refers to a weighting coefficient of the preliminary predicted value, α3 refers to a weight influence factor of the second projected pixel 1720 and a value range of α3 is [0, 0.5], α4 refers to a weight influence factor of the first projected pixel 1710 and a value range of α4 is [0, 0.5], X1 refers to a horizontal distance between the pixel s and the first reference line LR, and Y1 refers to a vertical distance between the pixel s and the first reference line TR.

In some embodiments, the processing device 112 may determine a target predicted value of the pixel s by weighting the pixel value of the first projected pixel 1630, the pixel value of the second projected pixel 1640, and the preliminary predicted value of the pixel s. For example, the processing device 112 may determine the target predicted value of the pixel s according to formula (12) below:

$$P_{x,y} = (wL*L_{O,y} + wT*T_{x,0} + \gamma*P'_{x,y}) \quad (12),$$

where $P_{x,y}$ refers to the target predicted value of the pixel s, $L_{O,y}$ refers to the pixel value of the first projected pixel 1710, $T_{x,0}$ refers to the pixel value of the second projected pixel 1720, and $P'_{x,y}$ refers to the preliminary predicted value of the pixel s.

According to those described in FIG. 16 and FIG. 17, the compensation region in the coding unit is expanded, thereby improving the effect of reducing the data redundancy of the coding unit.

In some embodiments, the present disclosure may also provide an encoder including a processor (e.g., the processing device 112). The processor may be configured to execute instructions to implement a process (e.g., process 400, process 1000, process 1100, process 1300, process 1400) described elsewhere in the present disclosure. As used herein, the encoder may further include a storage (not shown) storing instructions and data and the instructions and data may be executed by the processor.

In some embodiments, the present disclosure may also provide a storage storing instructions. The instructions may be executed to implement a process (e.g., process 400, process 1000, process 1100, process 1300, process 1400) described elsewhere in the present disclosure. In some embodiments, the instructions may be formed a program file and stored in the storage in a form of a software product, so that a computer device (e.g., a personal computer, a server, a network device, etc.) or a processor may execute the process described elsewhere in the present disclosure. In some embodiments, the storage may include but not limited to a U disk, a mobile hard disk, a read-only memory (ROM), a random access memory (RAM), a disk, an optical disk, a terminal device (e.g., a computer, a server, a mobile phone, a tablet, etc.), or the like, or any combination thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or comlocation of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system, comprising:
    at least one storage medium including a set of instructions; and
    at least one processor in communication with the at least one storage medium, wherein when executing the set of instructions, the at least one processor is directed to cause the system to:
        determine a predetermined region in a coding unit in an image, the predetermined region including a plurality of pixels, the predetermined region including an active boundary parallel to a target side of the coding unit, the active boundary being larger than a center-line between the target side and a side of the coding unit parallel to the target side and less than the side parallel to the target side, predetermined regions corresponding to at least a portion of prediction angles of a prediction mode are different;
        determine whether a prediction angle of the prediction mode is larger than or equal to 0° and smaller than or equal to 90°;
        in response to determining that the prediction angle of the prediction mode is larger than or equal to 0° and smaller than or equal to 90°, for each of the plurality of pixels in the predetermined region,
            determine a preliminary predicted value of the pixel based on at least one of one or more first reference lines associated with the coding unit along a prediction direction corresponding to the prediction angle, the one or more first reference lines being along a first side or a second side of the coding unit and each of the one or more first reference lines including a plurality of first reference pixels;

determine a compensation predicted value of the pixel based on at least one of one or more second reference lines associated with the coding unit along a compensation direction opposite to the prediction direction, the one or more second reference lines being along a third side or a fourth side of the coding unit and each of the one or more second reference lines including a plurality of second reference pixels; and determine a target predicted value of the pixel based on the preliminary predicted value and the compensation predicted value.

2. The system of claim 1, wherein at least one of the one or more second reference lines is determined by:

determining an intersection second reference pixel located at an intersection area of the third side and the fourth side of the coding unit based on one or more first reference pixels located at an intersection area of the first side and the fourth side, one or more first reference pixels located at an intersection area of the second side and the third side, a height of the coding unit, and a width of the coding unit; and determining a second reference line along the third side including the intersection second reference pixel and remainder second reference pixels determined based on the intersection second reference pixel, the one or more first reference pixels located at the intersection area of the second side and the third side, and the height of the coding unit; or determining a second reference line along the fourth side including the intersection second reference pixel and remainder second reference pixels determined based on the intersection second reference pixel, the one or more first reference pixels located at the intersection area of the first side and the fourth side, and the width of the coding unit.

3. The system of claim 1, wherein to determine the compensation predicted value of the pixel based on the at least one of one or more second reference lines associated with the coding unit along the compensation direction, the at least one processor is directed to cause the system to:

determine at least one target second reference line along a target side of the coding unit based on the compensation direction;

for each of the at least one target second reference line, determine an initial compensation predicted value corresponding to the pixel; and determine the compensation predicted value of the pixel based on at least one initial compensation projected value corresponding to the at least one target second reference line.

4. The system of claim 3, wherein, for each of the at least one target second reference line, to determine the initial compensation predicted value corresponding to the pixel, the at least one processor is directed to cause the system further to:

determine whether the compensation direction intersects the target side; and in response to determining that the compensation direction intersects the target side, for each of the at least one target second reference line, determine the initial compensation predicted value corresponding to the pixel based on at least one of the plurality of second reference pixels on the target second reference line.

5. The system of claim 4, wherein to determine the initial compensation predicted value corresponding to the pixel based on at least one of the plurality of second reference pixels on the target second reference line, the at least one processor is directed to cause the system further to:

determine a projected pixel corresponding to the pixel on the target second reference line along the compensation direction; and determine the initial compensation predicted value corresponding to the pixel based on the projected pixel.

6. The system of claim 4, wherein to determine the initial compensation predicted value corresponding to the pixel based on at least one of the plurality of second reference pixels on the target second reference line, the at least one processor is directed to cause the system further to:

determine two second reference pixels corresponding to the pixel on the target second reference line along the compensation direction; and determine the initial compensation predicted value corresponding to the pixel by performing an interpolation on the two second reference pixels.

7. The system of claim 4, wherein for each of the at least one target second reference line, to determine the initial compensation predicted value corresponding to the pixel, the at least one processor is directed to cause the system further to:

in response to determining that the compensation direction does not intersect the target side, determine at least one candidate second reference line along a candidate side of the coding unit, wherein the compensation direction intersects the candidate side and each of the at least one candidate second reference line corresponds to a respective one of the at least one target second reference line;

for each of the at least one candidate second reference line, determine at least one candidate compensation pixel corresponding to the pixel on the candidate second reference line along the compensation direction; and for each of the at least one target second reference line, determine the initial compensation predicted value corresponding to the pixel based on by mapping the corresponding at least one candidate compensation pixel onto an extension line of the target second reference line.

8. The system of claim 1, wherein the at least one processor is directed to cause the system to:

in response to determining that the prediction angle of the prediction mode is smaller than 0° or larger than 90°, for each of the plurality of pixels in the predetermined region, determine the preliminary predicted value of the pixel based on at least one of one or more target first reference lines along the prediction direction corresponding to the prediction angle, wherein for at least one of one or more target first reference lines, a count of first reference pixels on the target first reference line is larger than a first predetermined threshold;

determine the compensation predicted value of the pixel based on at least one of one or more candidate first reference lines along the compensation direction opposite to the prediction direction, wherein for at least one of one or more candidate first reference lines, a count of first reference pixels on the candidate first reference line is larger than a second predetermined threshold; and determine a target predicted value of the pixel based on the preliminary predicted value and the compensation predicted value.

9. The system of claim 1, wherein to determine the target predicted value of the pixel based on the preliminary predicted value and the compensation predicted value, the at least one processor is directed to cause the system further to:

determine a second weighting coefficient corresponding to the compensation predicted value of the pixel, wherein the second weighting coefficient is associated with a first global distance between the pixel and a first global projection location corresponding to the preliminary predicted value and a second global distance between the pixel and a second global projection location corresponding to the compensation predicted value;

determine a first weighting coefficient corresponding to the preliminary predicted value of the pixel based on the second weighting coefficient; and determine the target predicted value of the pixel by weighting the preliminary predicted value and the compensation predicted value based on the first weighting coefficient and the second weighting coefficient.

10. A method implemented on a computing device including at least one processor, at least one storage medium, and a communication platform connected to a network, the method comprising:

determining a predetermined region in a coding unit in an image, the predetermined region including a plurality of pixels, the predetermined region including an active boundary parallel to a target side of the coding unit, the active boundary being larger than a centerline between the target side and a side of the coding unit parallel to the target side and less than the side parallel to the target side, predetermined regions corresponding to at least a portion of prediction angles of a prediction mode are different;

determining whether a prediction angle of the prediction mode is larger than or equal to 0° and smaller than or equal to 90°;

in response to determining that the prediction angle of the prediction mode is larger than or equal to 0° and smaller than or equal to 90°, for each of the plurality of pixels in the predetermined region, determining a preliminary predicted value of the pixel based on at least one of one or more first reference lines associated with the coding unit along a prediction direction corresponding to the prediction angle, the one or more first reference lines being along a first side or a second side of the coding unit and each of the one or more first reference lines including a plurality of first reference pixels;

determining a compensation predicted value of the pixel based on at least one of one or more second reference lines associated with the coding unit along a compensation direction opposite to the prediction direction, the one or more second reference lines being along a third side or a fourth side of the coding unit and each of the one or more second reference lines including a plurality of second reference pixels; and determining a target predicted value of the pixel based on the preliminary predicted value and the compensation predicted value.

11. The method of claim 10, wherein at least one of the one or more second reference lines is determined by:

determining an intersection second reference pixel located at an intersection area of the third side and the fourth side of the coding unit based on one or more first reference pixels located at an intersection area of the first side and the fourth side, one or more first reference pixels located at an intersection area of the second side and the third side, a height of the coding unit, and a width of the coding unit; and determining a second reference line along the third side including the intersection second reference pixel and remainder second reference pixels determined based on the intersection second reference pixel, the one or more first reference pixels located at the intersection area of the second side and the third side, and the height of the coding unit; or determining a second reference line along the fourth side including the intersection second reference pixel and remainder second reference pixels determined based on the intersection second reference pixel, the one or more first reference pixels located at the intersection area of the first side and the fourth side, and the width of the coding unit.

12. The method of claim 10, wherein the determining the compensation predicted value of the pixel based on the at least one of one or more second reference lines associated with the coding unit along the compensation direction includes:

determining at least one target second reference line along a target side of the coding unit based on the compensation direction;

for each of the at least one target second reference line, determining an initial compensation predicted value corresponding to the pixel; and determining the compensation predicted value of the pixel based on at least one initial compensation projected value corresponding to the at least one target second reference line.

13. The method of claim 12, wherein, for each of the at least one target second reference line, the determining the initial compensation predicted value corresponding to the pixel includes:

determining whether the compensation direction intersects the target side; and in response to determining that the compensation direction intersects the target side, for each of the at least one target second reference line, determining the initial compensation predicted value corresponding to the pixel based on at least one of the plurality of second reference pixels on the target second reference line.

14. The method of claim 13, wherein for each of the at least one target second reference line, the determining the initial compensation predicted value corresponding to the pixel includes:

in response to determining that the compensation direction does not intersect the target side, determining at least one candidate second reference line along a candidate side of the coding unit, wherein the compensation direction intersects the candidate side and each of the at least one candidate second reference line corresponds to a respective one of the at least one target second reference line;

for each of the at least one candidate second reference line, determining at least one candidate compensation pixel corresponding to the pixel on the candidate second reference line along the compensation direction; and for each of the at least one target second reference line, determining the initial compensation predicted value corresponding to the pixel based on by mapping the corresponding at least one candidate compensation pixel onto an extension line of the target second reference line.

15. The method of claim 10, wherein the method further includes:

in response to determining that the prediction angle of the prediction mode is smaller than 0° or larger than 90°, for each of the plurality of pixels in the predetermined region, determining the preliminary predicted value of the pixel based on at least one of one or more target first reference lines along the prediction direction corresponding to the prediction angle, wherein for at least one of one or more target first reference lines, a count of first reference pixels on the target first reference line is larger than a first predetermined threshold;

determining the compensation predicted value of the pixel based on at least one of one or more candidate first reference lines along the compensation direction opposite to the prediction direction, wherein for at least one of one or more candidate first reference lines, a count of first reference pixels on the candidate first reference line is larger than a second predetermined threshold; and determining a target predicted value of the pixel based on the preliminary predicted value and the compensation predicted value.

16. The method of claim 10, wherein the determining the target predicted value of the pixel based on the preliminary predicted value and the compensation predicted value includes:

determining a second weighting coefficient corresponding to the compensation predicted value of the pixel, wherein the second weighting coefficient is associated with a first global distance between the pixel and a first global projection location corresponding to the preliminary predicted value and a second global distance between the pixel and a second global projection location corresponding to the compensation predicted value;

determining a first weighting coefficient corresponding to the preliminary predicted value of the pixel based on the second weighting coefficient; and determining the target predicted value of the pixel by weighting the preliminary predicted value and the compensation predicted value based on the first weighting coefficient and the second weighting coefficient.

17. A non-transitory computer readable medium, comprising executable instructions that, when executed by at least one processor, direct the at least one processor to perform a method, the method comprising:

determining a predetermined region in a coding unit in an image, the predetermined region including a plurality of pixels, the predetermined region including an active boundary parallel to a target side of the coding unit, the active boundary being larger than a centerline between the target side and a side of the coding unit parallel to the target side and less than the side parallel to the target side, predetermined regions corresponding to at least a portion of prediction angles of a prediction mode are different;

determining whether a prediction angle of the prediction mode is larger than or equal to 0° and smaller than or equal to 90°;

in response to determining that the prediction angle of the prediction mode is larger than or equal to 0° and smaller than or equal to 90°, for each of the plurality of pixels in the predetermined region, determining a preliminary predicted value of the pixel based on at least one of one or more first reference lines associated with the coding unit along a prediction direction corresponding to the prediction angle, the one or more first reference lines being along a first side or a second side of the coding unit and each of the one or more first reference lines including a plurality of first reference pixels;

determining a compensation predicted value of the pixel based on at least one of one or more second reference lines associated with the coding unit along a compensation direction opposite to the prediction direction, the one or more second reference lines being along a third side or a fourth side of the coding unit and each of the one or more second reference lines including a plurality of second reference pixels; and determining a target predicted value of the pixel based on the preliminary predicted value and the compensation predicted value.

18. The system of claim 1, wherein the at least one processor is further directed to cause the system to:

under the prediction mode, for each pixel in the coding unit, determining whether the pixel is in the predetermined region, in response to determining that the pixel is in the predetermined region, determine the target predicted value of the pixel based on the preliminary predicted value and the compensation predicted value; and in response to determining that the pixel is not in the predetermined region, determine the target predicted value of the pixel based on the preliminary predicted value.

19. The system of claim 1, wherein for a positive angle mode with a prediction angle larger than 90°, the predetermined region is located on a left part of the coding unit, for a positive angle mode with a prediction angle less than 0°, the predetermined region is located on an upper part of the coding unit, for a zero angle mode with a prediction angle equal to 0°, the predetermined region is located on a right part of the coding unit, for a zero angle mode with a prediction angle equal to 90°, the predetermined region is located on a lower part of the coding unit, for a negative angle mode with a prediction angle larger than 45° and less than 90°, the predetermined region is located on a right part of the coding unit, and for a negative angle mode with a prediction angle larger than 0° and less than 45°, the predetermined region is located on a lower part of the coding unit.

20. The system of claim 19, wherein the at least one processor is further directed to cause the system to:

under the prediction mode, for each pixel in the coding unit, determining whether the pixel is in the predetermined region, in response to determining that the pixel is in the predetermined region, determine the target predicted value of the pixel based on the preliminary predicted value and the compensation predicted value; and in response to determining that the pixel is not in the predetermined region, determine the target predicted value of the pixel based on the preliminary predicted value.

\* \* \* \* \*